(12) United States Patent  
Yuan et al.

(10) Patent No.: US 12,342,325 B2
(45) Date of Patent: Jun. 24, 2025

(54) TRANSMISSION RESOURCE CONFIGURATION METHOD AND APPARATUS

(71) Applicant: Huawei Technologies Co., Ltd., Shenzhen (CN)

(72) Inventors: Shitong Yuan, Chengdu (CN); Fengwei Liu, Chengdu (CN); Jing Qiu, Chengdu (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 456 days.

(21) Appl. No.: 17/651,086

(22) Filed: Feb. 15, 2022

(65) Prior Publication Data

US 2022/0174668 A1 Jun. 2, 2022

Related U.S. Application Data

(63) Continuation of application No. PCT/CN2019/101212, filed on Aug. 16, 2019.

(51) Int. Cl.
*H04W 72/0446* (2023.01)
*H04L 1/1812* (2023.01)
*H04W 74/0833* (2024.01)

(52) U.S. Cl.
CPC ....... *H04W 72/0446* (2013.01); *H04L 1/1812* (2013.01); *H04W 74/0833* (2013.01)

(58) Field of Classification Search
CPC ......... H04W 72/0446; H04W 74/0833; H04W 4/70; H04W 72/23; H04W 72/27; H04W 74/004; H04L 1/1812; H04L 5/16
See application file for complete search history.

(56) References Cited

U.S. PATENT DOCUMENTS 10,743,304 B2 *  8/2020  Takeda ............... H04L 5/1469
11,303,400 B2 *  4/2022  Zhang ................ H04W 72/044
(Continued)

FOREIGN PATENT DOCUMENTS

CN   101207439 A   6/2008
CN   109155935 A   1/2019
(Continued)

OTHER PUBLICATIONS

3rd Generation Partnership Project; Technical Specification Group Radio Access Network; NR; Physical layer procedures for control (Release 15), 3GPP TS 38.213 V15.6.0 (Jun. 2019), 107 pages.
3rd Generation Partnership Project; Technical Specification Group Radio Access Network; NR; Physical layer procedures for data (Release 15), 3GPP TS 38.214 V15.6.0 (Jun. 2019), 105 pages.
3rd Generation Partnership Project; Technical Specification Group Radio Access Network; NR; Radio Resource Control (RRC) protocol specification (Release 15), 3GPP TS 38.331 V15.6.0 (Jun. 2019),519 pages.
(Continued)

*Primary Examiner* — Salvador E Rivas
(74) *Attorney, Agent, or Firm* — Slater Matsil, LLP

(57) ABSTRACT

This application provides a transmission resource configuration method and an apparatus. The method includes: receiving, by a first node, a transmission resource configuration from a second node, where the transmission resource configuration includes a first configuration and a second configuration, the first configuration indicates that a start time resource is uplink and/or an end time resource is downlink in a configuration period, and the second configuration indicates that a start time resource is downlink and/or an end time resource is uplink in a configuration period; and switching, by the first node based on first signaling, a transmission direction of a first time resource in the first configuration by using the first configuration; or using, by the first node, the first configuration or the second configuration based on second signaling.

17 Claims, 10 Drawing Sheets

(56) References Cited

U.S. PATENT DOCUMENTS

| | | | |
|---|---|---|---|
| 2019/0020461 A1 | 1/2019 | Yerramalli et al. | |
| 2019/0124572 A1 | 4/2019 | Park et al. | |
| 2020/0177341 A1* | 6/2020 | Li | H04W 72/21 |
| 2022/0346080 A1* | 10/2022 | Ren | H04W 72/20 |
| 2023/0262755 A1* | 8/2023 | Liu | H04W 72/0446 370/329 |
| 2023/0362902 A1* | 11/2023 | Yuan | H04W 72/0446 |

FOREIGN PATENT DOCUMENTS

| | | |
|---|---|---|
| CN | 109392133 A | 2/2019 |
| CN | 109792347 A | 5/2019 |
| CN | 109964419 A | 7/2019 |
| EP | 3331177 A1 | 6/2018 |
| GB | 2580589 A | 7/2020 |
| WO | 2017206584 A1 | 12/2017 |
| WO | 2019047711 A1 | 3/2019 |
| WO | 2020168006 A1 | 8/2020 |

OTHER PUBLICATIONS

Nokia et al., "Mechanisms for resource multiplexing among backhaul and access links", 3GPP TSG RAN WG1 Meeting #97, R1-1907116, Reno, NV, US, May 13-17, 2019, 16 pages.

Qualcomm Inc., "IAB Resource Management Framework", 3GPP TSG RAN WG1 Meeting #96, R1-1902992, Athens, Greece, Feb. 25-Mar. 1, 2019, 8 pages.

Ericsson, "IAB resource configuration and coordination", 3GPP TSG-RAN WG1 Meeting #96bis, R1-1904834, Xi'an, China, Apr. 8-12, 2019, 7 pages.

AT&T, "Mechanisms for supporting access and backhaul link multiplexing", 3GPP TSG RAN WG1 #97, R1-1907155, Reno, USA, May 13-17, 2019, 11 pages.

Ericsson, "IAB resource configuration and multiplexing", 3GPP TSG-RAN WG1 Meeting #97, Reno, U.S., May 13-17, 2019, R1-1906588, total 9 pages.

* cited by examiner

| D | D | D | F | U | D | D | F | U | U |
FIG. 3
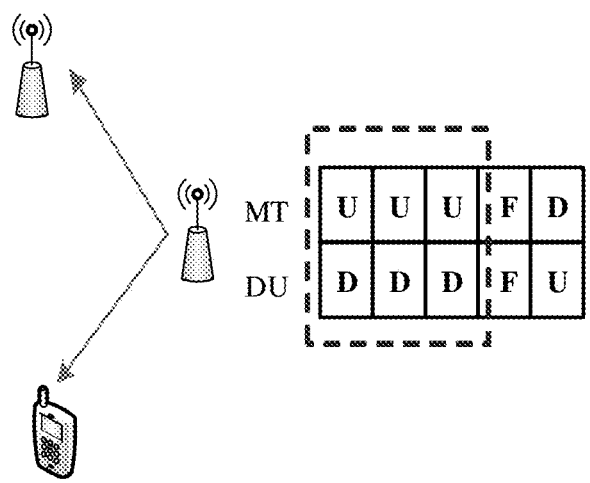
FIG. 4a
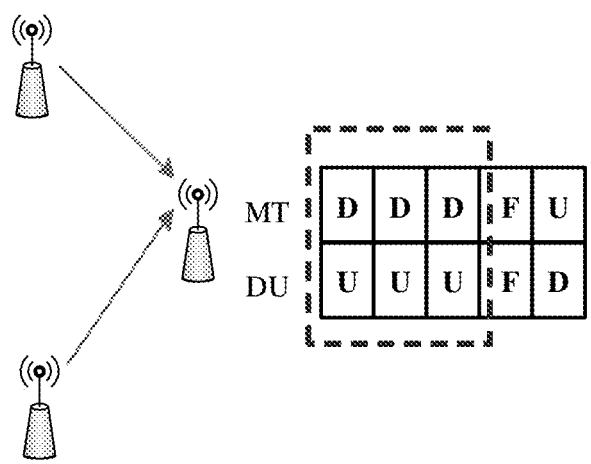
FIG. 4b

TRANSMISSION RESOURCE CONFIGURATION METHOD AND APPARATUS

CROSS-REFERENCE TO RELATED APPLICATIONS

This application is a continuation of International Patent Application No. PCT/CN2019/101212 filed on Aug. 16, 2019, the disclosure of which is hereby incorporated by reference in its entirety.

TECHNICAL FIELD

This application relates to the field of communications technologies, and in particular, to a transmission resource configuration method and an apparatus.

BACKGROUND

In a 5th generation (5G) mobile communications system new radio (NR) technology, a larger bandwidth can be used. For example, a millimeter-wave band can be used, and a large-scale antenna and a multi-beam system can be used. Therefore, a higher system rate can be provided in 5G. This facilitates application of an integrated access and backhaul (IAB) node in 5G. The IAB node integrates a wireless access link and a wireless backhaul link. The wireless access link is a communications link between user equipment (UE) and the IAB node, and the wireless backhaul link is a communications link between IAB nodes and a communications link between the IAB node and an IAB donor, used for data backhaul. Therefore, a wired transmission network is not required by the IAB node for the data backhaul, and the IAB node is more likely to be deployed in a dense urban scenario, thereby relieving burden of deployment of the wired transmission network. The wireless access link is referred to as an access link for short, and the wireless backhaul link is referred to as a backhaul link for short.

In-band relay is a relay solution in which the backhaul link and the access link share a same frequency band. The in-band relay is generally subject to a half-duplex constraint. Specifically, when receiving a downlink signal sent by a parent node of the IAB node, the IAB node cannot send a downlink signal to a child node of the IAB node, and when receiving an uplink signal sent by a child node of a relay node, the relay node cannot send an uplink signal to a parent node of the relay node. An IAB node in the NR may be divided into a mobile terminal (MT) and a distributed unit (DU). In the conventional technology, an IAB node obtains a time division duplex (TDD) uplink-downlink-configuration common (UL-DL-configuration common) from a broadcast message. The TDD uplink-downlink-configuration common includes a quantity of downlink slots and a quantity of uplink slots. In a configuration period, the quantity of downlink slots indicates a quantity of consecutive slots that are counted from a first slot, and the quantity of uplink slots indicates a quantity of consecutive slots that are counted backward from a last slot. In other words, the TDD uplink-downlink-configuration common indicates that a configuration period starts with a downlink slot starts and ends with an uplink slot.

If resource multiplexing is performed on both the access link and the backhaul link in the IAB node by using the TDD uplink-downlink-configuration common, how to better implement spatial multiplexing on the access link and the backhaul link under the half-duplex constraint is a problem that needs to be discussed.

SUMMARY

This application provides a transmission resource configuration method and an apparatus, to better implement spatial multiplexing on an access link and a backhaul link.

According to a first aspect, a transmission resource configuration method is provided. The method is performed by a node, and the node may be denoted as a first node. The first node may be an IAB node, a relay node, or any relay device. The method includes the following steps: receiving, by the first node, a transmission resource configuration from a second node, where the transmission resource configuration includes a first configuration and a second configuration, the first configuration indicates that a start time resource is uplink and/or an end time resource is downlink in a configuration period, and the second configuration indicates that a start time resource is downlink and/or an end time resource is uplink in a configuration period; and switching, by the first node based on first signaling, a transmission direction of a first time resource in the first configuration by using the first configuration; or using, by the first node, the first configuration or the second configuration based on second signaling. In this way, the first node can meet a half-duplex constraint, and spatial multiplexing on an access link and a backhaul link can be implemented. This avoids a case in which the first node has no opportunity to use a portion of periodic resources or measure a portion of periodic signals when the first node has the first configuration. A usage rule when the two sets of configurations are received is determined, so that nodes of different vendors can be coordinated when the first configuration, especially a TDD pattern starting with an uplink slot indicated by U, is introduced, thereby ensuring normal operation of a system.

In a possible design, the first signaling is used to indicate to detect a synchronization signal block SSB on the first time resource; and the switching, by the first node based on first signaling, a transmission direction of a first time resource in the first configuration by using the first configuration may be implemented in the following manner: switching, by the first node, the transmission direction of the first time resource in the first configuration from uplink to downlink. In this way, the first node (for example, an IAB MT) can work in a manner and behavior that can be expected by a network (a donor base station). In a scenario in which the first node (for example, the IAB MT) determines a set of transmission resource configurations, for the IAB MT, one or more rules corresponding to a portion of periodic resources or signals are specified, so that a parent node can smoothly interact with the first node, thereby ensuring stable network operation.

In a possible design, the first signaling is used to indicate to measure a reference signal on the first time resource; and the switching, by the first node based on first signaling, a transmission direction of a first time resource in the first configuration by using the first configuration may be implemented in the following manner: switching, by the first node, the transmission direction of the first time resource in the first configuration from uplink to downlink. In this way, the first node (for example, an IAB MT) can work in a manner and behavior that can be expected by a network (a donor base station). In a scenario in which the first node (for example, the IAB MT) determines a set of transmission resource configurations, for the IAB MT, one or more rules corresponding to a portion of periodic resources or signals are specified, so that a parent node can smoothly interact with the first node, thereby ensuring stable network operation.

In a possible design, the first signaling is used to indicate to send a physical random access channel PRACH on the first time resource; and the switching, by the first node based on first signaling, a transmission direction of a first time resource in the first configuration by using the first configuration may be implemented in the following manner: switching, by the first node, the transmission direction of the first time resource in the first configuration from downlink to uplink. In this way, the first node (for example, an IAB MT) can work in a manner and behavior that can be expected by a network (a donor base station). In a scenario in which the first node (for example, the IAB MT) determines a set of transmission resource configurations, for the IAB MT, one or more rules corresponding to a portion of periodic resources or signals are specified, so that a parent node can smoothly interact with the first node, thereby ensuring stable network operation.

In a possible design, the first signaling is used to indicate to receive a search space of a downlink physical control channel on the first time resource; and the switching, by the first node based on first signaling, a transmission direction of a first time resource in the first configuration by using the first configuration may be implemented in the following manner: switching, by the first node, the transmission direction of the first time resource in the first configuration from uplink to downlink. In this way, the first node (for example, an IAB MT) can work in a manner and behavior that can be expected by a network (a donor base station). In a scenario in which the first node (for example, the IAB MT) determines a set of transmission resource configurations, for the IAB MT, one or more rules corresponding to a portion of periodic resources or signals are specified, so that a parent node can smoothly interact with the first node, thereby ensuring stable network operation.

In a possible design, the first signaling is used to indicate to send hybrid automatic repeat request HARQ feedback information on the first time resource; and the switching, by the first node based on first signaling, a transmission direction of a first time resource in the first configuration by using the first configuration may be implemented in the following manner: switching, by the first node, the transmission direction of the first time resource in the first configuration from downlink to uplink. In this way, the first node (for example, an IAB MT) can work in a manner and behavior that can be expected by a network (a donor base station). In a scenario in which the first node (for example, the IAB MT) determines a set of transmission resource configurations, for the IAB MT, one or more rules corresponding to a portion of periodic resources or signals are specified, so that a parent node can smoothly interact with the first node, thereby ensuring stable network operation.

In a possible design, the first signaling is used to indicate to send aperiodic channel state information CSI, periodic channel state information CSI, semi-persistent CSI, or an aperiodic sounding reference signal SRS on the first time resource; and the switching, by the first node based on first signaling, a transmission direction of a first time resource in the first configuration by using the first configuration may be implemented in the following manner: switching, by the first node, the transmission direction of the first time resource in the first configuration from downlink to uplink. In this way, the first node (for example, an IAB MT) can work in a manner and behavior that can be expected by a network (a donor base station). In a scenario in which the first node (for example, the IAB MT) determines a set of transmission resource configurations, for the IAB MT, one or more rules corresponding to a portion of periodic resources or signals are specified, so that a parent node can smoothly interact with the first node, thereby ensuring stable network operation.

In a possible design, the second signaling is used to indicate to detect an SSB on a second time resource; and the using, by the first node, the first configuration or the second configuration based on second signaling includes: using, by the first node, the first configuration when the second time resource in the first configuration is downlink; or using the second configuration when the second time resource in the first configuration is uplink. In this way, when the first node receives and stores the two sets of configurations, when sending and receiving a special signal/channel, the first node may adaptively determine a direction of a transmission resource, so that if sending and reception in space division are enabled, sending and reception of another signal of a same type are affected as little as possible.

In a possible design, the second signaling is used to indicate to measure a reference signal on the second time resource; and the using, by the first node, the first configuration or the second configuration based on second signaling may be implemented in the following manner: using, by the first node, the first configuration when the second time resource in the first configuration is downlink; or using the second configuration when the second time resource in the first configuration is uplink. In this way, when the first node receives and stores the two sets of configurations, when sending and receiving a special signal/channel, the first node may adaptively determine a direction of a transmission resource, so that if sending and reception in space division are enabled, sending and reception of another signal of a same type are affected as little as possible.

In a possible design, the second signaling is used to indicate to send a PRACH on the second time resource; and the using, by the first node, the first configuration or the second configuration based on second signaling may be implemented in the following manner: using, by the first node, the first configuration when the second time resource in the first configuration is uplink; or using the second configuration when the second time resource in the first configuration is downlink. In this way, when the first node receives and stores the two sets of configurations, when sending and receiving a special signal/channel, the first node may adaptively determine a direction of a transmission resource, so that if sending and reception in space division are enabled, sending and reception of another signal of a same type are affected as little as possible.

In a possible design, the second signaling is used to indicate to receive a search space of a downlink physical control channel on the second time resource; and the using, by the first node, the first configuration or the second configuration based on second signaling may be implemented in the following manner: using, by the first node, the first configuration when the second time resource in the first configuration is downlink; or using the second configuration when the second time resource in the first configuration is uplink. In this way, when the first node receives and stores the two sets of configurations, when sending and receiving a special signal/channel, the first node may adaptively determine a direction of a transmission resource, so that if sending and reception in space division are enabled, sending and reception of another signal of a same type are affected as little as possible.

In a possible design, the second signaling is used to indicate to send HARQ feedback information on the second time resource; and the using, by the first node, the first configuration or the second configuration based on second signaling may be implemented in the following manner: using, by the first node, the first configuration when the second time resource in the first configuration is uplink; or using the second configuration when the second time resource in the first configuration is downlink. In this way, when the first node receives and stores the two sets of configurations, when sending and receiving a special signal/channel, the first node may adaptively determine a direction of a transmission resource, so that if sending and reception in space division are enabled, sending and reception of another signal of a same type are affected as little as possible.

In a possible design, the second signaling is used to indicate to send CSI, periodic CSI, semi-persistent CSI, or an aperiodic SRS on the second time resource; and the using, by the first node, the first configuration or the second configuration based on second signaling may be implemented in the following manner: using, by the first node, the first configuration when the second time resource in the first configuration is uplink; or using the second configuration when the second time resource in the first configuration is downlink. In this way, when the first node receives and stores the two sets of configurations, when sending and receiving a special signal/channel, the first node may adaptively determine a direction of a transmission resource, so that if sending and reception in space division are enabled, sending and reception of another signal of a same type are affected as little as possible.

In a possible design, the first configuration includes a quantity of first uplink time resources starting from the start time resource and/or a quantity of first downlink time resources with the end time resource as the end.

In a possible design, the second configuration includes a quantity of second downlink time resources starting from the start time resource and/or a quantity of second uplink time resources with the end time resource as the end.

In a possible design, the transmission resource configuration further includes a transmission resource period; and the method further includes: overwriting, by the first node based on the transmission resource period, one or more second patterns in the transmission resource configuration as one or more first patterns; or reserving, by the first node based on the transmission resource period, a second pattern and a first pattern at time domain locations of one or more second patterns in the transmission resource configuration.

In a possible design, the first configuration is an IAB node-dedicated configuration (for example, tdd-UL-DL-ConfigDedicated-IAB-MT), and the second configuration is a common configuration; or both the first configuration and the second configuration are IAB node-dedicated configurations.

In a possible design, the first time resource is expressed in a quantity of slots or symbols.

In a possible design, receiving, by the first node, a time division duplex TDD configuration from the second node may be implemented in the following manner: receiving, by the first node, a broadcast message or a radio resource control RRC message from the second node; obtaining the second configuration from the broadcast message; and obtaining the first configuration from the RRC message; or receiving, by the first node, an RRC message from the second node; and obtaining the first configuration and the second configuration from the RRC message.

According to a second aspect, a transmission resource configuration method is provided. The method is performed by a node, and the node may be denoted as a second node. The second node may be an IAB node, a relay node, or any relay device. The method includes the following steps: sending, by the second node, a transmission resource configuration to a first node, where the transmission resource configuration includes a first configuration and a second configuration, the first configuration indicates that a start time resource is uplink and/or an end time resource is downlink in a configuration period, and the second configuration indicates that a start time resource is downlink and/or an end time resource is uplink in a configuration period. In this way, the first configuration and the second configuration are sent to the first node, so that the first node can meet a half-duplex constraint, and spatial multiplexing on an access link and a backhaul link can be implemented. This avoids a case in which the first node has no opportunity to use a portion of periodic resources or measure a portion of periodic signals when the first node has the first configuration. A usage rule when the two sets of configurations are received is determined, so that nodes of different vendors can be coordinated when the first configuration, especially a TDD pattern starting with an uplink slot indicated by U, is introduced, thereby ensuring normal operation of a system.

In a possible design, the second node further sends first signaling to the first node, where the first signaling is used by the first node to switch a transmission direction of a first time resource in the first configuration by using the first configuration.

In a possible design, the second node further sends second signaling to the first node, where the second signaling is used by the first node to use the first configuration or the second configuration.

In a possible design, the first signaling is used to indicate to detect a synchronization signal block SSB on the first time resource; the first signaling is used to indicate to measure a reference signal on the first time resource; the first signaling is used to indicate to send a physical random access channel PRACH on the first time resource; the first signaling is used to indicate to receive a search space of a downlink physical control channel on the first time resource; the first signaling is used to indicate to send hybrid automatic repeat request HARQ feedback information on the first time resource; or the first signaling is used to indicate to send aperiodic channel state information CSI, periodic channel state information CSI, semi-persistent CSI, or an aperiodic sounding reference signal SRS on the first time resource. Indicated by the first signaling, the first node (for example, an IAB MT) can work in a manner and behavior that can be expected by a network (a donor base station or a parent IAB node). In a scenario in which the first node (for example, the IAB MT) determines a set of transmission resource configurations, for the IAB MT, one or more rules corresponding to a portion of periodic resources or signals are specified, so that a parent node can smoothly interact with the first node, thereby ensuring stable network operation.

In a possible design, the second signaling is used to indicate to detect an SSB on a second time resource; the second signaling is used to indicate to measure a reference signal on the second time resource; the second signaling is used to indicate to send a PRACH on the second time resource; the second signaling is used to indicate to receive a search space of a downlink physical control channel on the second time resource; the second signaling is used to indicate to send HARQ feedback information on the second time resource; or the second signaling is used to indicate to send CSI, periodic CSI, semi-persistent CSI, or an aperiodic SRS on the second time resource. Indicated by the second signaling, when the first node receives and stores the two sets of configurations, when sending and receiving a special signal/channel, the first node may adaptively determine a direction of a transmission resource, so that if sending and reception in space division are enabled, sending and reception of another signal of a same type are affected as little as possible.

In a possible design, the first configuration includes a quantity of first uplink time resources starting from the start time resource and/or a quantity of first downlink time resources with the end time resource as the end.

In a possible design, the second configuration includes a quantity of second downlink time resources starting from the start time resource and/or a quantity of second uplink time resources with the end time resource as the end.

In a possible design, the second node further sends a transmission resource period to the first node.

In a possible design, the first configuration is an IAB node-dedicated configuration, and the second configuration is a common configuration; or both the first configuration and the second configuration are IAB node-dedicated configurations.

In a possible design, the first time resource is expressed in a quantity of slots or symbols.

According to a third aspect, an apparatus is provided. The apparatus may be a node, where the node is denoted as a first node; may be an apparatus located in a node; or may be an apparatus that can be used with a node. In a design, the apparatus may include modules that are in a one-to-one correspondence with the methods/operations/steps/actions described in the first aspect. The modules may be implemented by a hardware circuit, software, or a combination of a hardware circuit and software. In a design, the apparatus may include a processing module and a communications module. The processing module is configured to invoke the communications module to perform a receiving and/or sending function. For example:

The communications module is configured to receive a transmission resource configuration from a second node, where the transmission resource configuration includes a first configuration and a second configuration, the first configuration indicates that a start time resource is uplink and/or an end time resource is downlink in a configuration period, and the second configuration indicates that a start time resource is downlink and/or an end time resource is uplink in a configuration period.

The processing module is configured to switch, based on first signaling, a transmission direction of a first time resource in the first configuration by using the first configuration; or use the first configuration or the second configuration based on second signaling. In this way, the first node can meet a half-duplex constraint, and spatial multiplexing on an access link and a backhaul link can be implemented. This avoids a case in which the first node has no opportunity to use a portion of periodic resources or measure a portion of periodic signals when the first node has the first configuration. A usage rule when the two sets of configurations are received is determined, so that nodes of different vendors can be coordinated when the first configuration, especially a TDD pattern starting with an uplink slot indicated by U, is introduced, thereby ensuring normal operation of a system.

In a possible design, the first signaling is used to indicate to detect a synchronization signal block SSB on the first time resource; and the processing module is configured to switch the transmission direction of the first time resource in the first configuration from uplink to downlink. In this way, the first node (for example, an IAB MT) can work in a manner and behavior that can be expected by a network (a donor base station). In a scenario in which the first node (for example, the IAB MT) determines a set of transmission resource configurations, for the IAB MT, one or more rules corresponding to a portion of periodic resources or signals are specified, so that a parent node can smoothly interact with the first node, thereby ensuring stable network operation.

In a possible design, the first signaling is used to indicate to measure a reference signal on the first time resource; and the processing module is configured to switch the transmission direction of the first time resource in the first configuration from uplink to downlink. In this way, the first node (for example, an IAB MT) can work in a manner and behavior that can be expected by a network (a donor base station). In a scenario in which the first node (for example, the IAB MT) determines a set of transmission resource configurations, for the IAB MT, one or more rules corresponding to a portion of periodic resources or signals are specified, so that a parent node can smoothly interact with the first node, thereby ensuring stable network operation.

In a possible design, the first signaling is used to indicate to send a physical random access channel PRACH on the first time resource; and the processing module is configured to switch the transmission direction of the first time resource in the first configuration from downlink to uplink. In this way, the first node (for example, an IAB MT) can work in a manner and behavior that can be expected by a network (a donor base station). In a scenario in which the first node (for example, the IAB MT) determines a set of transmission resource configurations, for the IAB MT, one or more rules corresponding to a portion of periodic resources or signals are specified, so that a parent node can smoothly interact with the first node, thereby ensuring stable network operation.

In a possible design, the first signaling is used to indicate to receive a search space of a downlink physical control channel on the first time resource; and the processing module is configured to switch the transmission direction of the first time resource in the first configuration from uplink to downlink. In this way, the first node (for example, an IAB MT) can work in a manner and behavior that can be expected by a network (a donor base station). In a scenario in which the first node (for example, the IAB MT) determines a set of transmission resource configurations, for the IAB MT, one or more rules corresponding to a portion of periodic resources or signals are specified, so that a parent node can smoothly interact with the first node, thereby ensuring stable network operation.

In a possible design, the first signaling is used to indicate to send hybrid automatic repeat request HARQ feedback information on the first time resource; and the processing module is configured to switch the transmission direction of the first time resource in the first configuration from downlink to uplink. In this way, the first node (for example, an IAB MT) can work in a manner and behavior that can be expected by a network (a donor base station). In a scenario in which the first node (for example, the IAB MT) determines a set of transmission resource configurations, for the IAB MT, one or more rules corresponding to a portion of periodic resources or signals are specified, so that a parent node can smoothly interact with the first node, thereby ensuring stable network operation.

In a possible design, the first signaling is used to indicate to send aperiodic channel state information CSI, periodic channel state information CSI, semi-persistent CSI, or an aperiodic sounding reference signal SRS on the first time resource; and the processing module is configured to switch the transmission direction of the first time resource in the first configuration from downlink to uplink. In this way, the first node (for example, an IAB MT) can work in a manner and behavior that can be expected by a network (a donor base station). In a scenario in which the first node (for example, the IAB MT) determines a set of transmission resource configurations, for the IAB MT, one or more rules corresponding to a portion of periodic resources or signals are specified, so that a parent node can smoothly interact with the first node, thereby ensuring stable network operation.

In a possible design, the second signaling is used to indicate to detect an SSB on a second time resource; and the processing module is configured to use the first configuration when the second time resource in the first configuration is downlink; or use the second configuration when the second time resource in the first configuration is uplink. In this way, when the first node receives and stores the two sets of configurations, when sending and receiving a special signal/channel, the first node may adaptively determine a direction of a transmission resource, so that if sending and reception in space division are enabled, sending and reception of another signal of a same type are affected as little as possible.

In a possible design, the second signaling is used to indicate to measure a reference signal on the second time resource; and the processing module is configured to: use the first configuration when the second time resource in the first configuration is downlink; or use the second configuration when the second time resource in the first configuration is uplink. In this way, when the first node receives and stores the two sets of configurations, when sending and receiving a special signal/channel, the first node may adaptively determine a direction of a transmission resource, so that if sending and reception in space division are enabled, sending and reception of another signal of a same type are affected as little as possible.

In a possible design, the second signaling is used to indicate to send a PRACH on the second time resource; and the processing module is configured to: use the first configuration when the second time resource in the first configuration is uplink; or use the second configuration when the second time resource in the first configuration is downlink. In this way, when the first node receives and stores the two sets of configurations, when sending and receiving a special signal/channel, the first node may adaptively determine a direction of a transmission resource, so that if sending and reception in space division are enabled, sending and reception of another signal of a same type are affected as little as possible.

In a possible design, the second signaling is used to indicate to receive a search space of a downlink physical control channel on the second time resource; and the processing module is configured to: use the first configuration when the second time resource in the first configuration is downlink; or use the second configuration when the second time resource in the first configuration is uplink. In this way, when the first node receives and stores the two sets of configurations, when sending and receiving a special signal/channel, the first node may adaptively determine a direction of a transmission resource, so that if sending and reception in space division are enabled, sending and reception of another signal of a same type are affected as little as possible.

In a possible design, the second signaling is used to indicate to send HARQ feedback information on the second time resource; and the processing module is configured to: use the first configuration when the second time resource in the first configuration is uplink; or use the second configuration when the second time resource in the first configuration is downlink. In this way, when the first node receives and stores the two sets of configurations, when sending and receiving a special signal/channel, the first node may adaptively determine a direction of a transmission resource, so that if sending and reception in space division are enabled, sending and reception of another signal of a same type are affected as little as possible.

In a possible design, the second signaling is used to indicate to send CSI, periodic CSI, semi-persistent CSI, or an aperiodic SRS on the second time resource; and the processing module is configured to: use the first configuration when the second time resource in the first configuration is uplink; or use the second configuration when the second time resource in the first configuration is downlink. In this way, when the first node receives and stores the two sets of configurations, when sending and receiving a special signal/channel, the first node may adaptively determine a direction of a transmission resource, so that if sending and reception in space division are enabled, sending and reception of another signal of a same type are affected as little as possible.

In a possible design, the first configuration includes a quantity of first uplink time resources starting from the start time resource and/or a quantity of first downlink time resources with the end time resource as the end.

In a possible design, the second configuration includes a quantity of second downlink time resources starting from the start time resource and/or a quantity of second uplink time resources with the end time resource as the end.

In a possible design, the transmission resource configuration further includes a transmission resource period; and the processing module is further configured to: overwrite, based on the transmission resource period, one or more second patterns in the transmission resource configuration as one or more first patterns; or reserve, based on the transmission resource period, a second pattern and a first pattern at time domain locations of one or more second patterns in the transmission resource configuration.

In a possible design, the first configuration is an IAB node-dedicated configuration, and the second configuration is a common configuration; or both the first configuration and the second configuration are IAB node-dedicated configurations.

In a possible design, the first time resource is expressed in a quantity of slots or symbols.

In a possible design, the communications module is configured to: receive a broadcast message or a radio resource control RRC message from the second node; obtain the second configuration from the broadcast message; and obtain the first configuration from the RRC message; or receive an RRC message from the second node; and obtain the first configuration and the second configuration from the RRC message.

According to a fourth aspect, an apparatus is provided. The apparatus may be a node, where the node is denoted as a second node; may be an apparatus located in a second node; or may be an apparatus that can be used with a second node. A plurality of second nodes and a plurality of first nodes may be connected to the apparatus. In a design, the apparatus may include modules that are in a one-to-one correspondence with the methods/operations/steps/actions described in the second aspect. The modules may be implemented by a hardware circuit, software, or a combination of a hardware circuit and software. In a design, the apparatus may include a processing module and a communications module. The processing module is configured to invoke the communications module to perform a receiving and/or sending function. For example:

The communications module is configured to send a transmission resource configuration to a first node, where the transmission resource configuration includes a first configuration and a second configuration, the first configuration indicates that a start time resource is uplink and/or an end time resource is downlink in a configuration period, and the second configuration indicates that a start time resource is downlink and/or an end time resource is uplink in a configuration period. In this way, the first configuration and the second configuration are sent to the first node, so that the first node can meet a half-duplex constraint, and spatial multiplexing on an access link and a backhaul link can be implemented. This avoids a case in which the first node has no opportunity to use a portion of periodic resources or measure a portion of periodic signals when the first node has the first configuration. A usage rule when the two sets of configurations are received is determined, so that nodes of different vendors can be coordinated when the first configuration, especially a TDD pattern starting with an uplink slot indicated by U, is introduced, thereby ensuring normal operation of a system.

In a possible design, the communications module is further configured to send first signaling to the first node, where the first signaling is used by the first node to switch a transmission direction of a first time resource in the first configuration by using the first configuration.

In a possible design, the communications module is further configured to send second signaling to the first node, where the second signaling is used by the first node to use the first configuration or the second configuration.

In a possible design, the first signaling is used to indicate to detect a synchronization signal block SSB on the first time resource; the first signaling is used to indicate to measure a reference signal on the first time resource; the first signaling is used to indicate to send a physical random access channel PRACH on the first time resource; the first signaling is used to indicate to receive a search space of a downlink physical control channel on the first time resource; the first signaling is used to indicate to send hybrid automatic repeat request HARQ feedback information on the first time resource; or the first signaling is used to indicate to send aperiodic channel state information CSI, periodic channel state information CSI, semi-persistent CSI, or an aperiodic sounding reference signal SRS on the first time resource. Indicated by the first signaling, the first node (for example, an IAB MT) can work in a manner and behavior that can be expected by a network (a donor base station). In a scenario in which the first node (for example, the IAB MT) determines a set of transmission resource configurations, for the IAB MT, one or more rules corresponding to a portion of periodic resources or signals are specified, so that a parent node can smoothly interact with the first node, thereby ensuring stable network operation.

In a possible design, the second signaling is used to indicate to detect an SSB on a second time resource; the second signaling is used to indicate to measure a reference signal on the second time resource; the second signaling is used to indicate to send a PRACH on the second time resource; the second signaling is used to indicate to receive a search space of a downlink physical control channel on the second time resource; the second signaling is used to indicate to send HARQ feedback information on the second time resource; or the second signaling is used to indicate to send CSI, periodic CSI, semi-persistent CSI, or an aperiodic SRS on the second time resource. Indicated by the second signaling, when the first node receives and stores the two sets of configurations, when sending and receiving a special signal/channel, the first node may adaptively determine a direction of a transmission resource, so that if sending and reception in space division are enabled, sending and reception of another signal of a same type are affected as little as possible.

In a possible design, the first configuration includes a quantity of first uplink time resources starting from the start time resource and/or a quantity of first downlink time resources with the end time resource as the end.

In a possible design, the second configuration includes a quantity of second downlink time resources starting from the start time resource and/or a quantity of second uplink time resources with the end time resource as the end.

In a possible design, the communications module is further configured to send a transmission resource period to the first node.

In a possible design, the first configuration is an IAB node-dedicated configuration, and the second configuration is a common configuration; or both the first configuration and the second configuration are IAB node-dedicated configurations.

In a possible design, the first time resource is expressed in a quantity of slots or symbols.

According to a fifth aspect, an embodiment of this application provides an apparatus. The apparatus includes a communications interface and a processor, and the communications interface is used by the apparatus to communicate with another device, for example, to send and receive data or a signal. For example, the communications interface may be a transceiver, a circuit, a bus, a module, or a communications interface of another type, and the another device may be a second node. The processor is configured to invoke a group of programs, instructions, or data to perform the method described in the first aspect. The apparatus may further include a memory, configured to store the programs, the instructions, or the data invoked by the processor. The memory is coupled to the processor, and when executing the programs, the instructions or the data stored in the memory, the processor can implement the method described in the first aspect.

For example, the communications interface is configured to receive a transmission resource configuration from the second node, where the transmission resource configuration includes a first configuration and a second configuration, the first configuration indicates that a start time resource is uplink and/or an end time resource is downlink in a configuration period, and the second configuration indicates that a start time resource is downlink and/or an end time resource is uplink in a configuration period.

The processor is configured to switch, based on first signaling, a transmission direction of a first time resource in the first configuration by using the first configuration; or use the first configuration or the second configuration based on second signaling. In this way, the first node can meet a half-duplex constraint, and spatial multiplexing on an access link and a backhaul link can be implemented. This avoids a case in which the first node has no opportunity to use a portion of periodic resources or measure a portion of periodic signals when the first node has the first configuration. A usage rule when the two sets of configurations are received is determined, so that nodes of different vendors can be coordinated when the first configuration, especially a TDD pattern starting with an uplink slot indicated by U, is introduced, thereby ensuring normal operation of a system.

According to a sixth aspect, an embodiment of this application provides an apparatus. The apparatus includes a communications interface and a processor, and the communications interface is used by the apparatus to communicate with another device, for example, to send and receive data or a signal. For example, the communications interface may be a transceiver, a circuit, a bus, a module, or a communications interface of another type, and the another device may be a first node, for example, an IAB node. The processor is configured to invoke a group of programs, instructions, or data to perform the method described in the second aspect. The apparatus may further include a memory, configured to store the programs, the instructions, or the data invoked by the processor. The memory is coupled to the processor, and when executing the programs, the instructions or the data stored in the memory, the processor can implement the method described in the second aspect.

The communications interface is configured to send a transmission resource configuration to the first node, where the transmission resource configuration includes a first configuration and a second configuration, the first configuration indicates that a start time resource is uplink and/or an end time resource is downlink in a configuration period, and the second configuration indicates that a start time resource is downlink and/or an end time resource is uplink in a configuration period. In this way, the first configuration and the second configuration are sent to the first node, so that the first node can meet a half-duplex constraint, and spatial multiplexing on an access link and a backhaul link can be implemented. This avoids a case in which the first node has no opportunity to use a portion of periodic resources or measure a portion of periodic signals when the first node has the first configuration. A usage rule when the two sets of configurations are received is determined, so that nodes of different vendors can be coordinated when the first configuration, especially a TDD pattern starting with an uplink slot indicated by U, is introduced, thereby ensuring normal operation of a system.

According to a seventh aspect, an embodiment of this application further provides a computer-readable storage medium. The computer-readable storage medium stores a computer-readable instruction, and when the computer-readable instruction is run on a computer, the computer is enabled to perform the method according to any one of the first aspect or the possible designs of the first aspect.

According to an eighth aspect, an embodiment of this application further provides a computer-readable storage medium, including an instruction. When the instruction is run on a computer, the computer is enabled to perform the method according to any one of the second aspect or the possible designs of the second aspect.

According to a ninth aspect, an embodiment of this application provides a chip system. The chip system includes a processor, and may further include a memory, configured to implement the method according to any one of the first aspect or the possible designs of the first aspect. The chip system may include a chip, or may include a chip and another discrete component.

Optionally, the chip system further includes a transceiver.

The transceiver is configured to receive a transmission resource configuration from a second node, where the transmission resource configuration includes a first configuration and a second configuration, the first configuration indicates that a start time resource is uplink and/or an end time resource is downlink in a configuration period, and the second configuration indicates that a start time resource is downlink and/or an end time resource is uplink in a configuration period.

The processor is configured to switch, based on first signaling, a transmission direction of a first time resource in the first configuration by using the first configuration; or use the first configuration or the second configuration based on second signaling. In this way, the first node can meet a half-duplex constraint, and spatial multiplexing on an access link and a backhaul link can be implemented. This avoids a case in which the first node has no opportunity to use a portion of periodic resources or measure a portion of periodic signals when the first node has the first configuration. A usage rule when the two sets of configurations are received is determined, so that nodes of different vendors can be coordinated when the first configuration, especially a TDD pattern starting with an uplink slot indicated by U, is introduced, thereby ensuring normal operation of a system.

According to a tenth aspect, an embodiment of this application provides a chip system. The chip system includes a processor, and may further include a memory, configured to implement the method according to any one of the second aspect or the possible designs of the second aspect. The chip system may include a chip, or may include a chip and another discrete component.

Optionally, the chip system further includes a transceiver.

For example, the processor is configured to invoke the transceiver to send a transmission resource configuration to a first node, where the transmission resource configuration includes a first configuration and a second configuration, the first configuration indicates that a start time resource is uplink and/or an end time resource is downlink in a configuration period, and the second configuration indicates that a start time resource is downlink and/or an end time resource is uplink in a configuration period. In this way, the first configuration and the second configuration are sent to the first node, so that the first node can meet a half-duplex constraint, and spatial multiplexing on an access link and a backhaul link can be implemented. This avoids a case in which the first node has no opportunity to use a portion of periodic resources or measure a portion of periodic signals when the first node has the first configuration. A usage rule when the two sets of configurations are received is determined, so that nodes of different vendors can be coordinated when the first configuration, especially a TDD pattern starting with an uplink slot indicated by U, is introduced, thereby ensuring normal operation of a system.

According to an eleventh aspect, an embodiment of this application further provides a computer program product, including an instruction. When the computer program product runs on a computer, the computer is enabled to perform the method according to any one of the first aspect or the possible designs of the first aspect, or perform the method according to any one of the second aspect or the possible designs of the second aspect.

According to a twelfth aspect, an embodiment of this application provides a system. The system includes the apparatus according to the third aspect or the fifth aspect and the apparatus according to the fourth aspect or the sixth aspect.

BRIEF DESCRIPTION OF THE DRAWINGS

FIG. 3 is a schematic diagram of a TDD uplink-downlink-configuration common according to an embodiment of this application;

FIG. 4*a* is a schematic diagram 1 of spatial multiplexing on an MT and a DU according to an embodiment of this application;

FIG. 4*b* is a schematic diagram 2 of spatial multiplexing on an MT and a DU according to an embodiment of this application;

DETAILED DESCRIPTION OF ILLUSTRATIVE EMBODIMENTS

Embodiments of this application provide a transmission resource configuration method and an apparatus, to better implement spatial multiplexing on an access link and a backhaul link. The method and the apparatus are based on a same inventive concept. Because a problem-resolving principle of the method is similar to that of the apparatus, implementations of the apparatus and the method may mutually refer to each other. No repeated description is provided. In descriptions of the embodiments of this application, the term "and/or" describes an association relationship for describing associated objects and represents that three relationships may exist. For example, A and/or B may represent the following three cases: Only A exists, both A and B exist, and only B exists. The character "/" generally indicates an "or" relationship between the associated objects. In this application, "at least one" means one or more, and "a plurality of" means two or more. In addition, it should be understood that, in descriptions of this application, terms such as "first" and "second" are merely used for differentiation and description, but cannot be understood as an indication or implication of relative importance or an indication or implication of an order.

The communication method provided in the embodiments of this application may be used in a 4th generation (4G) communications system, for example, a long term evolution (LTE) system; a 5th generation (5G) communications system, for example, a new radio (NR) system; or any of various future communications systems, for example, a 6th generation (6G) communications system.

The following describes in detail the embodiments of this application with reference to the accompanying drawings.

Figure 1:
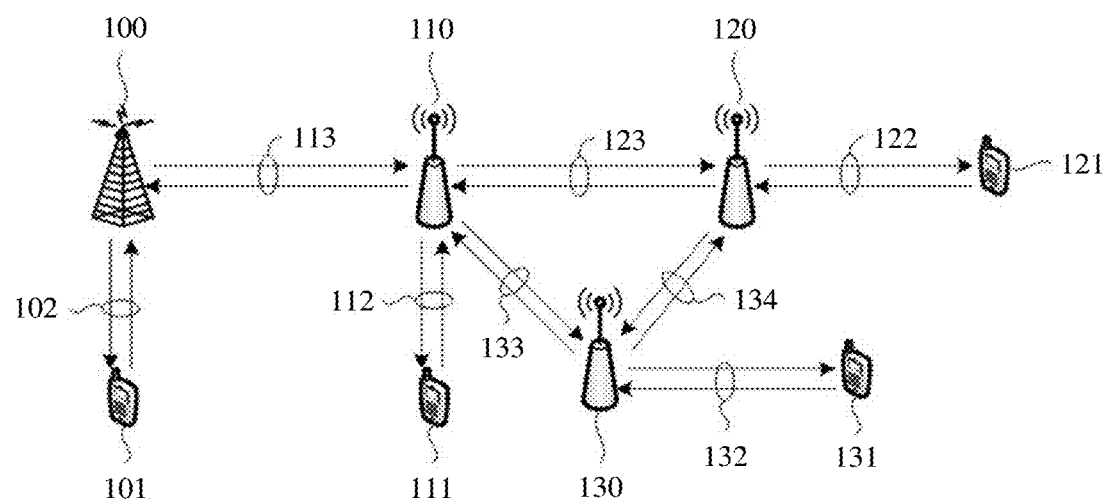
FIG. 1 is a schematic structural diagram of a communications system according to an embodiment of this application.

FIG. 1 is a schematic structural diagram of a communications system to which an embodiment of this application is applicable. In the communications system shown in FIG. 1, an IAB system is provided. The IAB system includes at least one base station 100, one or more terminals 101 served by the base station 100, one or more relay nodes (RN), and one or more terminals served by the one or more relay nodes. In the embodiments of this application, the relay node may also be referred to as a relay device, or a relay transmission and reception point (rTRP).

For example, in the IAB system shown in FIG. 1, the relay node includes an rTRP 110, an rTRP 120, and an rTRP 130, one or more terminals 11 served by the rTRP 110, one or more terminals 121 served by the rTRP 120, and one or more terminals 131 served by the rTRP 130. Generally, the base station 100 is referred to as a donor base station (for example, donor next generation nodeB, DgNB). The rTRP 110 is connected to the base station 100 through a wireless backhaul link 113. The rTRP 120 is connected to the relay node rTRP 110 through a wireless backhaul link 123 to access a network, and the rTRP 130 is connected to the relay node rTRP 110 through a wireless backhaul link 133 to access the network. The rTRP 120 serves the one or more terminals 121, and the rTRP 130 serves the one or more terminals 131. In FIG. 1, both the relay nodes rTRP 110 and rTRP 120 are connected to the network through the wireless backhaul links. In this application, the wireless backhaul links are viewed from a perspective of the relay node. For example, the wireless backhaul link 113 is a backhaul link of the relay node rTRP 110, and the wireless backhaul link 123 is a backhaul link of the relay node rTRP 120. As shown in FIG. 1, a relay node (for example, the relay node 120) may be connected to another relay node 110 through a wireless backhaul link (for example, the wireless backhaul link 123), to access the network. In addition, the relay node may access the network through a plurality of levels of wireless relay nodes.

In the embodiments of this application, the donor base station may also be referred to as a donor node, or referred to as an IAB donor. The base station includes but is not limited to an evolved NodeB (eNB), a radio network controller (RNC), a NodeB (NB), a base station controller (BSC), a base transceiver station (BTS), a home base station (for example, a home evolved NodeB, or a home NodeB, HNB), a baseband unit (BBU), a new radio base station (for example, a gNB), or the like.

It may be understood that the IAB system may further include more or fewer relay nodes.

Generally, a node that provides a resource of the wireless backhaul link, for example, the relay node 110, is referred to as a parent node of the relay node 120, and the relay node 120 is referred to as a child node of the relay node 110. Generally, a child node may be considered as a terminal of a parent node. It should be understood that, in the IAB system shown in FIG. 1, one relay node is connected to one parent node. However, in a future relay system, to improve reliability of a wireless backhaul link, there are a plurality of parent nodes that simultaneously serve one relay node (for example, the relay node 120). The rTRP 130 in FIG. 1 may further be connected to the relay node rTRP 120 through a backhaul link 134. That is, both the rTRP 110 and the rTRP 120 are parent nodes of the rTRP 130. In this application, the terminal 101, the terminal 111, the terminal 121, and the terminal 131 may each be a static or mobile device. For example, the mobile device may be a mobile phone, an intelligent terminal, a tablet computer, a notebook computer, a video game console, a multimedia player, or even a mobile relay node. The static device is usually located at a fixed location, for example, a computer, or an access point (access a network through a wireless link, for example, a static relay node). Names of the relay nodes rTRPs 110, 120, and 130 are not limited in a scenario or a network in which the relay nodes rTRPs 110, 120, and 130 are deployed, and there may be any other name such as a relay or RN. In this application, the rTRP is used only for ease of description.

In FIG. 1, the wireless links 102, 112, 122, 132, 113, 123, 133, and 134 may be bidirectional links, including uplink and downlink transmission links. Particularly, the wireless backhaul links 113, 123, 133, and 134 may be used by a parent node for serving a child node. For example, the parent node 100 provides a wireless backhaul service for the child node 110. It should be understood that an uplink and a downlink of the backhaul link may be separated. To be specific, the uplink and the downlink are not transmitted through a same node. Downlink transmission means that a parent node transmits information or data to a child node. For example, the node 100 transmits information or data to the node 110. Uplink transmission means that a child node transmits information or data to a parent node. For example, the node 110 transmits information or data to the node 100. The node is not limited to a network node or a terminal. For example, in a D2D scenario, a terminal may be used as a relay node to serve another terminal. In some scenarios, the wireless backhaul link may also be an access link. For example, the backhaul link 123 may also be considered as an access link of the node 110, and the backhaul link 113 is also an access link of the node 100. It should be understood that the parent node may be a base station or a relay node, and the child node may be a relay node or a terminal having a relay function. For example, in a D2D scenario, the child node may also be a terminal.

In FIG. 1, the donor node is a node that may access a core network through the node, or is an anchor base station in a radio access network, and may access the network through the anchor base station. The anchor base station is responsible for processing data at a packet data convergence protocol (PDCP) layer, receiving data from the core network and forwarding the data to the relay node, or receiving data from the relay node and forwarding the data to the core network. The donor node may generally access the network in a wired manner, for example, through an optical fiber.

Figure 2:
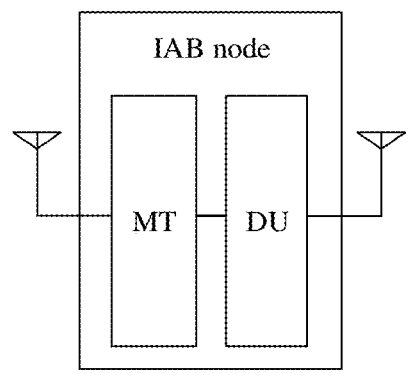
FIG. 2 is a schematic structural diagram of an IAB node according to an embodiment of this application.

For any relay node (or IAB node), two parts are included, and are configured to implement functions similar to those of a base station and functions similar to those of a terminal. Referring to FIG. 2, the IAB node may include a mobile terminal (MT) and a distributed unit (DU). The MT is a functional module used for implementing a function similar to that of a common terminal, and is configured to communicate with a parent node, for example, send uplink (UL) data to the parent node, and receive downlink (DL) data from the parent node. The DU is a functional module used for implementing a function similar to that of a common base station, and is configured to communicate with a child node, for example, send DL data to the child node, and receive UL data from the child node.

Transmission resources of the MT in the IAB node may be classified into three types: downlink (D), uplink (U), and flexible (F). The three types of resources are also supported by a common terminal, and may be indicated by using signaling. Transmission resources of the DU in the IAB node may be classified into three types: uplink (U), downlink (D), and flexible (F). The uplink, downlink, and flexible resources of the DU may further be classified into three types: hard, soft, and not available. The hard resource of the DU indicates a resource that is always available to the DU, the soft resource of the DU indicates whether the resource is available to the DU depends on an indication of a parent node, and the not available resource of the DU indicates a resource that is not available to the DU.

The terminal obtains a TDD uplink-downlink-configuration common (UL-DL-configuration common) from a broadcast message. The TDD uplink-downlink-configuration common includes a quantity of downlink slots/symbols and a quantity of uplink slots/symbols. In a configuration period, the quantity of downlink slots indicates a quantity of consecutive slots that are counted from a first slot, and the quantity of uplink slots indicates a quantity of consecutive slots that are counted backward from a last slot. The quantity of downlink symbols indicates a quantity of consecutive symbols that are counted forward from a first symbol in a slot remaining not to be indicated, that is, a flexible slot, and the quantity of uplink symbols indicates a quantity of consecutive symbols that are counted backward from a last symbol in a slot remaining not to be indicated, that is, a flexible slot. The symbols described herein all refer to OFDM symbols in an OFDM system, and an absolute time length of the OFDM symbol is related to a subcarrier spacing. In other words, the TDD uplink-downlink-configuration common indicates that in a configuration period, a downlink slot starts and an uplink slot ends. After the terminal accesses a cell, the base station configures a TDD-UL-DL-dedicated configuration (TDD-UL-DL-ConfigDedicated) by using radio resource control (RRC) signaling, to further indicate a transmission direction of a portion of "F" slots or symbols in the TDD configuration configured in the broadcast message. The MT and the DU in the IAB node may use a resource configuration method of a common terminal, that is, a resource configuration method supports a configuration period starting with a downlink time resource and ending with an uplink time resource. As shown in FIG. 3, according to the TDD uplink-downlink-configuration common, a configuration manner that starts with D and ends with U is provided.

The in-band relay is generally subject to a half-duplex constraint. Specifically, when receiving a downlink signal sent by a parent node of the IAB node, the IAB node cannot send a downlink signal to a child node of the IAB node, and when receiving an uplink signal sent by a child node of a relay node, the relay node cannot send an uplink signal to a parent node of the relay node. In a configuration period, on a downlink time resource of the DU in the IAB node, the DU sends downlink data to the child node or the terminal. That spatial multiplexing is implemented on the DU and the MT in the IAB node means that when the DU performs downlink sending, the MT performs uplink sending. When the DU performs uplink reception, the MT performs downlink reception. When the spatial multiplexing is performed on the DU and the MT in the JAB node, the MT in the JAB node can receive or send data on a downlink time resource of the DU. However, if the MT in the IAB node only supports a configuration period starting with a downlink time resource and ending with an uplink time resource, the MT in the IAB node can only receive downlink data on a downlink time resource of the DU. In this way, the IAB node sends the downlink data to the child node and receives the downlink data from the parent node on one time resource. Due to the half-duplex constraint, the IAB node cannot send a downlink signal to the child node of the JAB node when the JAB node receives a downlink signal sent by the parent node of the JAB node. Consequently, the spatial multiplexing cannot be implemented.

To implement spatial multiplexing on the access link and the backhaul link, that is, spatial multiplexing on the MT and the DU, in this embodiment of this application, a dedicated transmission resource configuration is provided for the IAB node, to be specific, a configuration supports a configuration period starting with an uplink time resource and ending with a downlink time resource. As shown in FIG. 4a, the MT supports a resource configuration method in which an uplink time resource starts. On a downlink transmission resource of the DU in the IAB node, a transmission direction of the MT is uplink. That is, when the DU in the IAB node sends downlink data to a child node, the MT sends uplink data to a parent node. In this way, the IAB node meets a half-duplex constraint, and spatial multiplexing on an access link and a backhaul link is implemented. Further, as shown in FIG. 4b, the DU supports a resource configuration method in which an uplink time resource starts. On a downlink transmission resource of the MT in the IAB node, a transmission direction of the DU is uplink. That is, when the MT in the IAB node receives downlink data from a parent node, the DU receives uplink data from a child node. In this way, the IAB node meets a half-duplex constraint, and spatial multiplexing on an access link and a backhaul link is implemented.

As described above, this embodiment of this application provides a dedicated transmission resource configuration for the IAB node. The dedicated transmission resource configuration is defined as a configuration starting from an uplink time resource. The uplink time resource includes an uplink slot or an uplink symbol. Certainly, the dedicated transmission resource configuration may also be defined as a configuration starting from a flexible time resource, where the flexible time resource includes a flexible slot or a flexible symbol.

Based on the foregoing descriptions, the following describes a specific procedure of the transmission resource configuration method in this embodiment of this application.

In this embodiment of this application, the transmission resource configuration method for a node is described, where an IAB node is used as an example of the node. In addition, for example, a transmission resource configuration of the MT in the IAB node is used as an example for description. It may be understood that the description in this embodiment may be correspondingly used in a transmission resource configuration of the DU in the IAB node, and technical ideas are the same.

Figure 5:
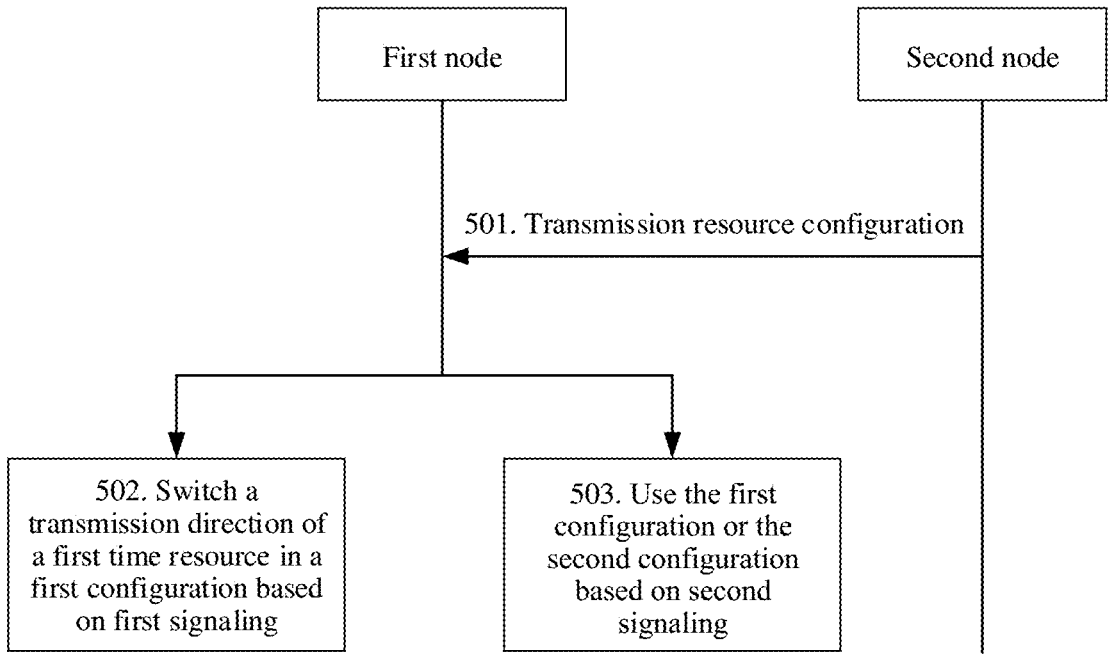
FIG. 5 is a schematic flowchart of a transmission resource configuration method according to an embodiment of this application.

Referring to FIG. 5, in an embodiment of this application, a specific procedure of a transmission resource configuration method is described as follows: The method is performed by a first node, and a second node is a parent node of the first node, or a second node is a donor node. The first node and the second node may each be a base station, a relay node, an IAB node, a terminal having a relay function, or any device having a relay function.

S501. The second node sends a transmission resource configuration to a first node, and the first node receives the transmission resource configuration from the second node.

The transmission resource configuration includes a first configuration and a second configuration. The "configuration" in the first configuration and the second configuration may be a time resource configuration, for example, a slot configuration. The "configuration" in the first configuration and the second configuration may be understood as a pattern; in this case, the first configuration may also be referred to as a first pattern, and the second configuration may also be referred to as a second pattern.

The first configuration indicates that a start time resource is uplink in a configuration period, or indicates that an end time resource is downlink in a configuration period, or indicates that a start time resource is uplink and an end time resource is downlink in a configuration period.

The second configuration indicates that a start time resource is downlink in a configuration period, or indicates that an end time resource is uplink in a configuration period, or indicates that a start time resource is downlink and an end time resource is uplink in a configuration period.

With reference to the foregoing description, in a possible embodiment, the first configuration herein may be understood as an IAB node-dedicated transmission resource configuration, and the second configuration herein may be understood as a TDD uplink-downlink-configuration common. The JAB node-dedicated transmission resource configuration may also be referred to as an JAB node-dedicated configuration for short. The TDD uplink-downlink-configuration common may also be referred to as a common configuration for short.

In this embodiment of this application, for ease of description, in a configuration period, "the start time resource is uplink" may be described as "starting with U", "the end time resource is downlink" may be described as "ending with D", "the start time resource is downlink" may be described as "starting with D", and "the end time resource is uplink" may be described as "ending with U".

In a possible implementation, the second node may send the transmission resource configuration to the first node by using messages of a plurality of types. The first configuration and the second configuration may be carried in same signaling, or may be carried in different signaling.

For example, the second configuration is carried in a broadcast message, and the second node sends the broadcast message to the first node, where the broadcast message carries the second configuration. The first node obtains the second configuration by monitoring the broadcast message. The first configuration is carried in an RRC message by using a semi-static resource. The second node semi-statically sends the RRC message to the first node, where the RRC message carries the first configuration. The first node obtains the first configuration by receiving the RRC message.

For another example, both the first configuration and the second configuration are carried in an RRC message by using a semi-static resource. The second node semi-statically sends the RRC message to the first node, where the RRC message carries the first configuration and the second configuration. The first node obtains the first configuration and the second configuration by receiving the RRC message.

After obtaining the transmission resource configuration, the first node transmits a message or data by using the transmission resource configuration. This embodiment of this application provides two different manners of using the transmission resource configuration, and the two manners are respectively described in S502 and S503. S502 or S503 may be performed after S501.

S502. The first node switches, based on first signaling, a transmission direction of a first time resource in the first configuration by using the first configuration.

In the first manner, the first node receives the first configuration and the second configuration, where the second configuration is used as a basic configuration, and overwrites or rewrites a configuration on all or a portion of time resources in the second configuration as the first configuration. On the time resources on which the second configuration is overwritten or rewritten as the first configuration, when the transmission direction of the first time resource in the first configuration does not match a transmission direction of to-be-transmitted signaling, the transmission direction of the first time resource in the first configuration is switched based on the first signaling.

The first configuration includes a quantity of first uplink time resources starting from the start time resource and/or a quantity of first downlink time resources with the end time resource as the end.

The second configuration includes a quantity of second downlink time resources starting from the start time resource and/or a quantity of second uplink time resources with the end time resource as the end.

S503. The first node uses the first configuration or the second configuration based on second signaling.

In the second manner, the first node receives the first configuration and the second configuration. The second configuration is used as a basic configuration. Two configurations (that is, the first configuration and the second configuration) are reserved at a portion of locations in the second configuration, and the second configuration is reserved at other locations. Certainly, there may be some guard intervals on all time resources of the first node. On time resources on which the first configuration and the second configuration are reserved, the first configuration or the second configuration is selected to be used based on the second signaling.

For example, the first node is an IAB node. Behavior of an MT in the IAB node (IAB MT) is used as an example. The first configuration may be understood as an IAB node-dedicated transmission resource configuration, and the second configuration may be understood as a TDD uplink-downlink-configuration common. The IAB MT receives, from a donor node (or a parent node), the TDD uplink-downlink-configuration common broadcast by a system message, and receives, from the donor node, the IAB node-dedicated transmission resource configuration. The IAB node-dedicated transmission resource configuration may be sent in a semi-static manner. The IAB node-dedicated configuration is used to overwrite some cell-specific TDD uplink-downlink-configurations common.

The following describes in detail a possible implementation in which the transmission resource configuration is used in the first manner.

The first node receives the first configuration and the second configuration, where the second configuration is used as a basic configuration, and a configuration on a portion of time resources in the second configuration is overwritten as the first configuration. In this way, a set of configurations can be determined.

After determining the set of configurations, the first node needs to process the configurations for some signals or channels, so that the signals or the channels can be used in the processed configurations. Therefore, the first node works in a manner or behavior that is expected by a network (donor node).

Figure 6:
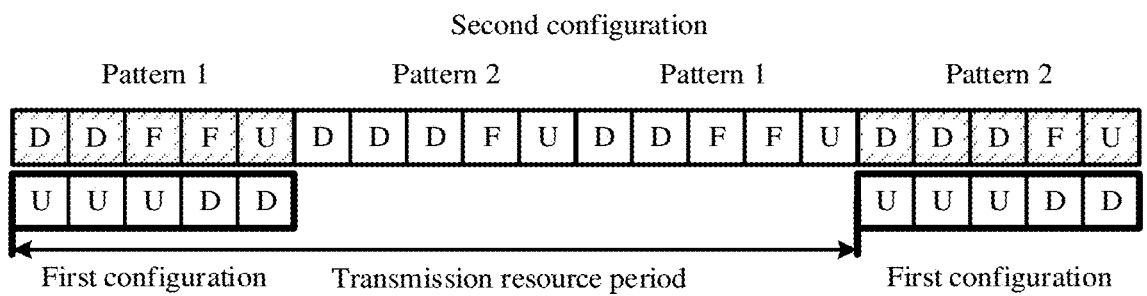
FIG. 6 is a schematic diagram 1 of a transmission resource configuration in a first manner according to an embodiment of this application.
Figure 7:
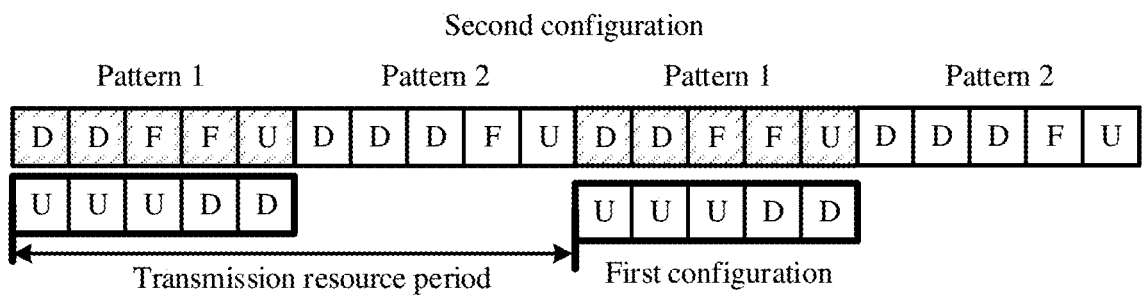
FIG. 7 is a schematic diagram 2 of a transmission resource configuration in a first manner according to an embodiment of this application.

In actual application, both the first configuration and the second configuration may include one or more patterns. For each type of configuration, one configuration period may be used as a unit, and one pattern is used in one configuration period. As shown in FIG. 6 and FIG. 7, for example, the second configuration includes two patterns, represented as a pattern 1 and a pattern 2. An example in which the first configuration includes one pattern is used. Certainly, the second configuration and the first configuration may include more or fewer patterns. Both the pattern 1 and the pattern 2 start with D and end with U. For example, each configuration period in the first configuration and the second configuration includes five time resources. For example, the time resource is a slot. For example, transmission directions of transmission resources in one configuration period in the pattern 1 may be represented as: DDFFU; and transmission directions of transmission resources in one configuration period in the pattern 2 may be represented as: DDDFU. Transmission directions of transmission resources in one configuration period in the first configuration may be represented as: UUUDD. Based on the initial second configuration, the pattern 1 and the pattern 2 may alternately exist.

The first node receives the first configuration, and replaces (that is, overwrites or rewrites) the pattern 1 or the pattern 2 on a portion of time resources with the first configuration. The overwriting may be periodically performed, and a period may be referred to as a transmission resource period. For example, in FIG. 6, 15 slots may be configured in the transmission resource period. In this case, the first configuration is used to overwrite the pattern 1 in one transmission resource period, and overwrite the pattern 2 in a next transmission resource period. In FIG. 7, 10 slots may be configured in the transmission resource period. In this case, the first configuration is fixedly used to overwrite the pattern 1 in each transmission resource period. Certainly, in another case, the first configuration is fixedly used to overwrite the pattern 2 in each transmission resource period. In a scenario in which a pattern is fixedly overwritten, the first node does not need to obtain the transmission resource period, but only needs to determine the pattern to be overwritten. The transmission resource period may also be configured by using an absolute time unit, for example, 5 ms or 10 ms.

Shadow parts in FIG. 6 and FIG. 7 indicate that the first configuration is reserved after the second configuration is overwritten by the first configuration, and the overwritten second configuration does not exist. In this way, only a whole set of transmission resource configurations is reserved.

The first node may overwrite the second configuration as the first configuration based on the configured transmission resource period. Certainly, the overwriting may also be performed in another manner. For example, the overwriting is performed based on a fixed pattern. Time domain resources in a section of the transmission resource period include a plurality of consecutive time domain resources. One or more consecutive or non-consecutive resources form a pattern based on a fixed arrangement and sequence, and the first configuration is used to overwrite the second configuration based on the pattern in the section of time domain resources.

In a scenario in which a part of the second configuration is overwritten, the first node reserves only a whole set of transmission resource configurations. Based on the set of transmission resource configurations, the transmission resource configurations are processed based on signaling when some signals or channels are transmitted. For example, a transmission direction is switched. The signaling is denoted as first signaling. Detailed descriptions are provided below. In the following description, the first time resource is a transmission resource in the first configuration that is used to overwrite the second configuration. The first time resource may be one or more slots or one or more symbols in one configuration period in the first configuration. The symbol may be an orthogonal frequency division multiplexing (OFDM) symbol. In the following descriptions, an example in which the first node is an IAB node is used, behavior of an IAB MT is used as an example, an example in which the first configuration is an IAB node-dedicated transmission resource configuration is used, and an example in which the second configuration is a TDD uplink-downlink-configuration common is used.

The first time resource is indicated by the first signaling based on the second configuration that is originally not overwritten by the first configuration.

(1) The first signaling is used to indicate to detect an SSB on the first time resource.

In NR, a primary synchronization signal (PSS), a secondary synchronization signal (SSS), and a physical broadcast channel (PBCH) are referred to as a synchronization signal/broadcast signal block (SS/PBCH block). In this application, for ease of description, the SS/PBCH block is referred to as an SSB.

The first signaling may be a system broadcast message, and includes one or more types of the following information: a time resource location at which a node currently accessed by the IAB MT sends an SSB through an air interface, an SSB sending period, and an SSB index.

If the first time resource in the first configuration is uplink, the first node switches the transmission direction of the first time resource in the first configuration from uplink to downlink. The switching can be understood as rewriting.

For example, on the first time resource on which a parent node (or a donor node) of the IAB MT sends the SSB, because a transmission direction of the SSB sent by the parent node is downlink, if there is a candidate location at which the parent node of the IAB MT sends the SSB in a configuration period in the IAB node-dedicated transmission resource configuration, a slot or a symbol that overlaps with a slot or a symbol in which the SSB is sent should be changed to a downlink slot or symbol. Resource transmission directions of the remaining slots and/or symbols in the configuration period may still be determined based on the JAB node-dedicated transmission resource configuration.

Figure 8:
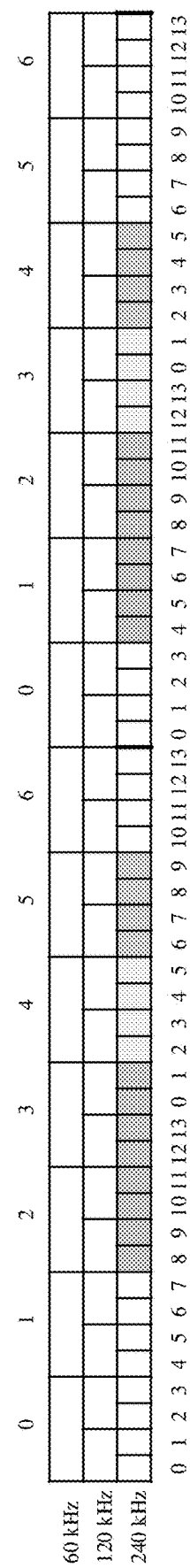
FIG. 8 is a schematic diagram of candidate sending locations of an SSB at different subcarrier spacings according to an embodiment of this application.

FIG. 8 shows candidate sending locations of an SSB at subcarrier spacings of 60 kHz, 120 kHz, and 240 kHz. FIG. 8 lists only a case in two 60 kHz slots. If the IAB MT uses a 60 kHz subcarrier spacing as a reference subcarrier spacing for the transmission resource configuration, each slot has seven OFDM symbols. At a location corresponding to a shadow grid in FIG. 8, a parent node DU may send an SSB. A transmission direction of a symbol corresponding to a shadow grid is switched from uplink to downlink, and resource transmission directions of symbols corresponding to remaining white grids may still be determined based on the IAB node-dedicated transmission resource configuration.

(2) The first signaling is used to indicate to measure a reference signal on the first time resource.

The reference signal may include: an SSB, a channel state information-reference signal (CSI-RS), a tracking reference signal (TRS), and a phase tracking reference signal (PT-RS). The first signaling may be RRC configuration signaling, a media access control control element (MAC CE), or downlink control information (DCI).

If the first time resource in the first configuration is uplink, the first node switches the transmission direction of the first time resource in the first configuration from uplink to downlink.

If the reference signal is an SSB, the first signaling is an SSB reception configuration (for example, an SS/PBCH block measurement timing configuration (SMTC)). The SMTC indicates the first time resource for measuring the SSB, that is, a time resource location at which the IAB MT measures the SSB in a neighboring cell. Regardless of whether the first time resource in a configured slot and/or symbol of the MT is downlink, the transmission direction needs to be considered as downlink. To be specific, if the transmission direction is uplink, the transmission direction needs to be rewritten as downlink. Resource transmission directions of remaining slots and/or symbols in the configuration period are still determined based on the IAB node-dedicated transmission resource configuration.

If the reference signal is a CSI-RS, the first signaling is a measurement configuration. The measurement configuration indicates the first time resource for measuring the CSI-RS, that is, a time resource location at which the IAB MT measures a CSI-RS at a target frequency and/or a CSI-RS in a target cell. Regardless of whether the first time resource in a configured slot and/or symbol of the MT is downlink, the transmission direction needs to be considered as downlink. To be specific, if the transmission direction is uplink, the transmission direction needs to be rewritten as downlink. Resource transmission directions of remaining slots and/or symbols in the configuration period are still determined based on the IAB node-dedicated transmission resource configuration.

(3) The first signaling is used to indicate to send a physical random access channel (PRACH) on the first time resource.

The first signaling herein may be a system broadcast message, an RRC configuration, or DCI of a PDCCH.

If the first time resource in the first configuration is downlink, the first node switches the transmission direction of the first time resource in the first configuration from downlink to uplink.

For example, in a configuration period in the IAB node-dedicated transmission resource configuration, if there is a PRACH resource, a transmission direction at a corresponding resource location is considered as uplink. In other words, if a transmission direction is downlink, the transmission direction needs to be rewritten as uplink.

In a possible implementation, in a configuration period of the IAB node-dedicated transmission resource configuration, if there is a PRACH resource, and the PRACH resource is not in a slot or a symbol in an uplink transmission direction in the configuration period, the IAB MT considers that the location is not a valid random access occasion (RO).

(4) The first signaling is used to indicate to receive a search space of a downlink physical control channel on the first time resource.

The first signaling herein may be a system broadcast message, and may include a master information block (MIB) and a system information block (system information block 1, SIB 1); or may be RRC configuration signaling.

If the first time resource in the first configuration is uplink, the first node switches the transmission direction of the first time resource in the first configuration from uplink to downlink.

For example, the IAB MT may receive a reception time configuration, that is, a search space configuration, of the physical downlink control channel (PDCCH) that is sent by a donor node or a parent node. The IAB MT determines, based on the search space configuration, time locations at which the PDCCH is to be monitored.

If a transmission direction of the time resource location indicated by the search space configuration is uplink in the configuration period in the IAB node-dedicated configuration, the search space configuration in the configuration period is ignored, and resource transmission directions of remaining slots and/or symbols in the configuration period are still determined based on the IAB node-dedicated configuration.

If there is a cell search space configuration in a configuration period in the IAB node-dedicated configuration, and a resource in the cell search space configuration overlaps with a resource corresponding to an uplink transmission direction in the IAB node-dedicated configuration, in the configuration period in the IAB node-dedicated configuration, a slot at the overlapping location is not overwritten by the IAB node-dedicated configuration (that is, the common configuration is reserved), or the slot at the overlapping location is changed to a downlink transmission direction.

(5) The first signaling is used to indicate to send hybrid automatic repeat request (HARQ) feedback information on the first time resource.

The first signaling herein may be an RRC configuration, a PDCCH, or a PDSCH.

If the first time resource in the first configuration is downlink, the first node switches the transmission direction of the first time resource in the first configuration from downlink to uplink.

Figure 9:
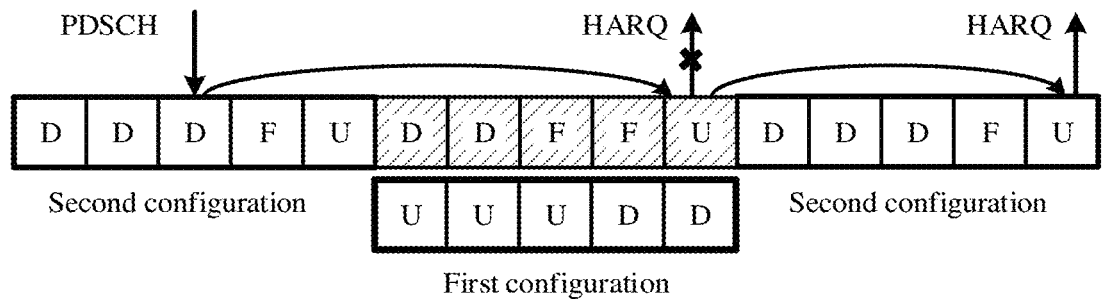
FIG. 9 is a schematic diagram of a transmission resource configuration during HARQ feedback in a first manner according to an embodiment of this application.

For example, as shown in FIG. 9, if a resource corresponding to a HARQ feedback time originally indicated by the first signaling overlaps with a D resource (or a D slot) in the IAB node-dedicated configuration, the HARQ feedback time is postponed to a U resource (or a U slot) in the IAB node-dedicated configuration. Alternatively, a K1 value is not expected to be received. The K1 value means that the HARQ feedback information is sent at a location of a K1$^{th}$ symbol after a currently scheduled data packet is received.

Alternatively, the first signaling is used to indicate to receive HARQ feedback information on the first time resource.

The first signaling herein may be an RRC configuration, a PDCCH, or a PDSCH.

If the first time resource in the first configuration is uplink, the first node switches the transmission direction of the first time resource in the first configuration from uplink to downlink.

(6) The first signaling is used to indicate to perform transmission on a physical uplink shared channel or a physical downlink shared channel on the first time resource.

The first signaling herein may be an RRC configuration or a system message.

Figure 10:
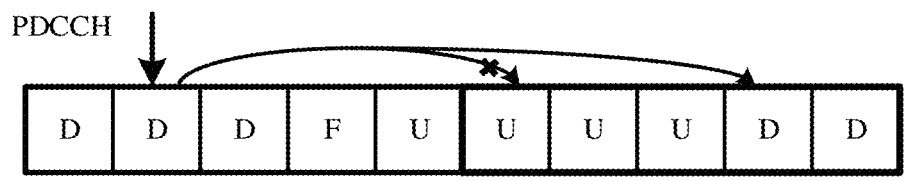
FIG. 10 is a schematic diagram of a transmission resource configuration of a PDSCH/PUSCH according to an embodiment of this application.

For example, as shown in FIG. 10, for a time domain resource configuration in a common configuration of a physical downlink shared channel (physical downlink shared channel, PDSCH)/physical uplink shared channel (PUSCH) of the IAB MT, a donor node or a parent node configures cell-specific time resource configurations (PDSCH-time domain resource allocation list and PUSCH-time domain resource allocation list) of the uplink and downlink shared channels for the IAB MT. However, the configuration usually matches the TDD common configuration that is broadcast in the cell, that is, the donor node or the parent node generally does not configure transmission resources of the uplink shared channel at a downlink location in the cell.

Because the IAB node-dedicated configuration is introduced into the transmission resource configuration in this embodiment of this application, a transmission direction indicated by a portion of transmission resources of the IAB MT is opposite to that of another terminal. Therefore, a rule and behavior of the MT need to be defined. To be specific, the IAB MT does not expect to receive a configuration that is sent by the parent node DU and that includes a transmission direction opposite to the transmission direction in the common configuration. If such a configuration is received, the MT ignores the corresponding PUSCH/PDSCH configuration, that is, does not perform the configuration.

(7) The first signaling is used to indicate to send any one of aperiodic channel state information (CSI) reporting, periodic CSI reporting, semi-persistent CSI reporting, or an aperiodic sounding reference signal (SRS) on the first time resource.

The first signaling herein may be an RRC configuration, a MAC CE, or DCI.

If the first time resource in the first configuration is downlink, the first node switches the transmission direction of the first time resource in the first configuration from downlink to uplink.

For example, in a configuration period in the IAB node-dedicated configuration, the IAB MT is not expected to be triggered by using the DCI to send aperiodic CSI feedback. If receiving an indication of the DCI to trigger the sending of the aperiodic CSI feedback, the IAB MT ignores the indication of the DCI.

For example, the periodic/semi-persistent CSI reporting indicated by the first signaling is not fed back at this time in a configuration period in the IAB node-dedicated configuration if a reporting occasion overlaps with a D resource in the IAB node-dedicated configuration.

For example, in a configuration period in the IAB node-dedicated configuration, the MT is not expected to be triggered by using the DCI to send the aperiodic SRS on a D resource in the IAB node-dedicated configuration.

For example, the periodic/semi-persistent SRS indicated by the first signaling is not sent at this time in a configuration period in the IAB node-dedicated configuration if a reporting occasion overlaps with a D resource.

The following describes in detail a possible implementation in which the transmission resource configuration is used in the second manner.

The first node receives the first configuration and the second configuration, where the second configuration is used as a basic configuration, and two configurations (that is, the first configuration and the second configuration) are reserved at a portion of locations in the second configuration, and the second configuration is reserved at other locations. On time resources on which the first configuration and the second configuration are reserved, the first configuration or the second configuration is selected to be used based on the second signaling.

In this manner, it may be understood that the first node reserves two sets of configurations, where one set is the original second configuration, and the other set is the first configuration reserved on a portion of time resources in the second configuration.

Figure 11:
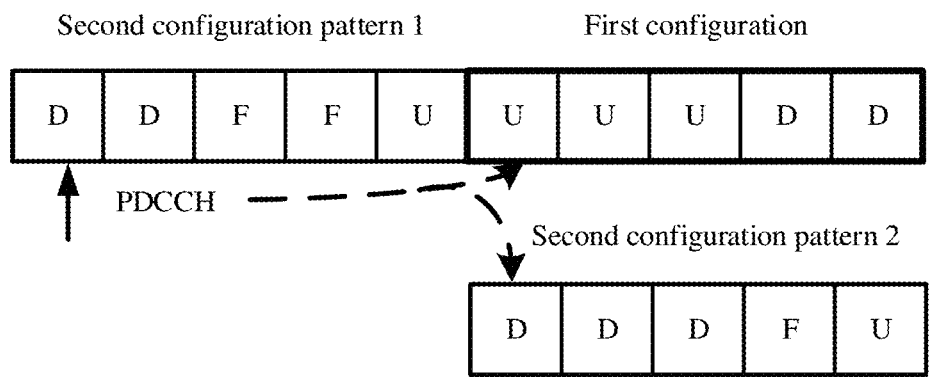
FIG. 11 is a schematic diagram of a transmission resource configuration in a second manner according to an embodiment of this application.

In actual application, both the first configuration and the second configuration may include one or more patterns. For each type of configuration, one configuration period may be used as a unit, and one pattern is used in one configuration period. As shown in FIG. 11, for example, the second configuration includes two patterns, represented as a pattern 1 and a pattern 2. An example in which the first configuration includes one pattern is used. Certainly, the second configuration and the first configuration may include more or fewer patterns. Both the pattern 1 and the pattern 2 start with D and end with U. For example, each configuration period in the first configuration and the second configuration includes five time resources. For example, the time resource is a slot. For example, transmission directions of transmission resources in one configuration period in the pattern 1 may be represented as: DDFFU; and transmission directions of transmission resources in one configuration period in the pattern 2 may be represented as: DDDFU. Transmission directions of transmission resources in one configuration period in the first configuration may be represented as: UUUDD. Based on the initial second configuration, the pattern 1 and the pattern 2 may alternately exist.

The first node receives the first configuration, and may reserve the first configuration at a selected location based on a transmission resource period. Alternatively, the first node may fixedly reserve the first configuration at a location in a pattern.

The first node needs to select whether to use the first configuration or the second configuration based on signaling. The signaling is denoted as second signaling. A second time resource indicated by the second node may be one or more slots or one or more symbols in one configuration period in the first configuration. The symbol may be an OFDM symbol. In the following descriptions, an example in which the first node is an IAB node is used, behavior of an IAB MT is used as an example, an example in which the first configuration is an IAB node-dedicated transmission resource configuration is used, and an example in which the second configuration is a TDD uplink-downlink-configuration common is used.

The second time resource i is indicated by the second signaling based on the second configuration that is originally not overwritten by the first configuration.

(1) The second signaling is used to indicate to detect an SSB on the second time resource.

The first node uses the first configuration when the second time resource in the first configuration is downlink; or uses the second configuration when the second time resource in the first configuration is uplink.

Figure 12:
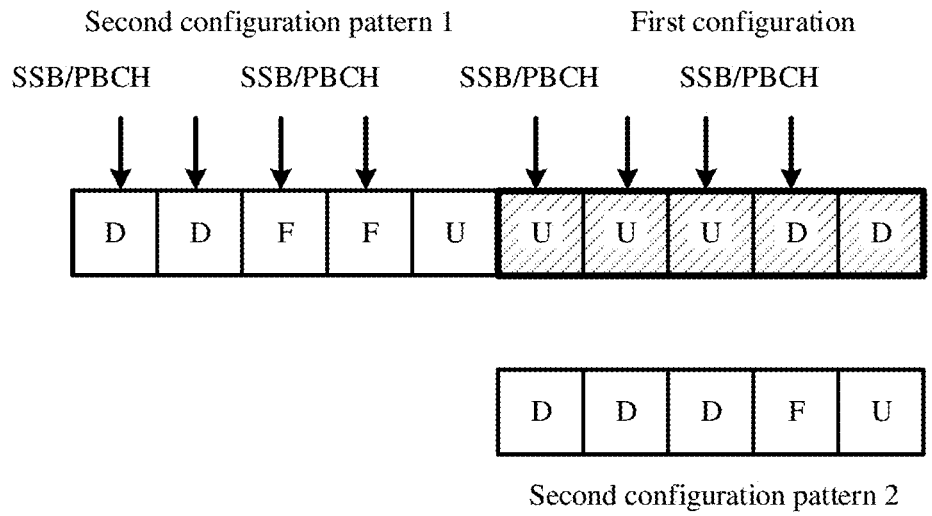
FIG. 12 is a schematic diagram of a transmission resource configuration when an SSB is detected according to an embodiment of this application.

For example, as shown in FIG. 12, a second time resource on which a parent node (or a donor node) of the IAB MT sends an SSB is indicated by an arrow. Because a transmission direction of the SSB sent by the parent node is downlink, and the second time resource in the IAB node-dedicated configuration is uplink, the IAB MT selects the TDD uplink-downlink-configuration common from the IAB node-dedicated configuration and the TDD uplink-downlink-configuration common. Alternatively, the IAB MT may partially use the IAB node-dedicated configuration. In other words, the IAB node-dedicated configuration is used on a downlink slot indicated by the IAB node-dedicated configuration.

If the parent node sends the SSB in a configuration period in the IAB node-dedicated configuration, a slot or a symbol that overlaps with a slot or a symbol in which the SSB is sent is considered as a downlink slot or symbol. Resource transmission directions of remaining slots and/or symbols in the configuration period may still be determined based on the IAB node-dedicated configuration.

(2) The second signaling is used to indicate to measure a reference signal on the second time resource.

The first node uses the first configuration when the second time resource in the first configuration is downlink; or uses the second configuration when the second time resource in the first configuration is uplink.

For example, the reference signal is an SSB, and the second signaling is an SMTC. The SMTC indicates the second time resource for measuring the SSB, that is, a time resource location at which the IAB MT measures the SSB in a neighboring cell (that is, the parent node). When the first configuration or the second configuration is selected, it needs to be ensured, based on a principle, that the second time resource is downlink in a configured slot and/or symbol of the MT.

If the second time resource of the first node in the first configuration is downlink, the first configuration is used.

If the second time resource of the first node in the first configuration is uplink, the second configuration is used. Optionally, if there is an SSB to be measured, a TDD uplink-downlink-configuration common is used for the entire configuration period. Alternatively, if there is an SSB to be measured, the IAB node-dedicated configuration is used. In a configuration period in the IAB node-dedicated configuration, a TDD uplink-downlink-configuration common is used for a time resource location at which the SSB is measured, and resource transmission directions of remaining slots and/or symbols are still determined based on the IAB node-dedicated transmission resource configuration.

(3) The second signaling is used to indicate to send a PRACH on the second time resource.

The first node uses the first configuration when the second time resource in the first configuration is uplink; or uses the second configuration when the second time resource in the first configuration is downlink.

At a PRACH resource location of the IAB MT, because random access is performed in an uplink transmission direction, the IAB MT uses or partially uses an IAB node-dedicated configuration. Generally, based on a cell-specific PRACH resource configuration, a random access resource is at the end of the configuration period in a TDD uplink-downlink-configuration common. In a configuration period in the IAB node-dedicated configuration, a slot at the end may be a D slot or an F slot.

Therefore, if there is a PRACH resource in the configuration period in the IAB node-dedicated configuration, the IAB node-dedicated configuration is not used, but the TDD uplink-downlink-configuration common is used in the configuration period.

If there is a PRACH resource in the configuration period in the IAB node-dedicated configuration, a slot or a symbol that overlaps with a slot or a symbol in which the PRACH resource is sent is rewritten as an uplink slot or symbol. Resource transmission directions of remaining slots and/or symbols in the configuration period may still be determined based on the IAB node-dedicated configuration.

(4) The second signaling is used to indicate to receive a search space of a downlink physical control channel on the second time resource.

The first node uses the first configuration when the second time resource in the first configuration is downlink; or uses the second configuration when the second time resource in the first configuration is uplink.

The IAB MT receives a reception time configuration, that is, a search space configuration, of the PDCCH that is sent by a donor node or a parent node. The IAB MT determines, based on the search space configuration, time locations at which the PDCCH is to be monitored. Certainly, this does not mean that the network definitely sends the PUCCH at this location, but the network potentially sends the PUCCH at this location.

Figure 13:
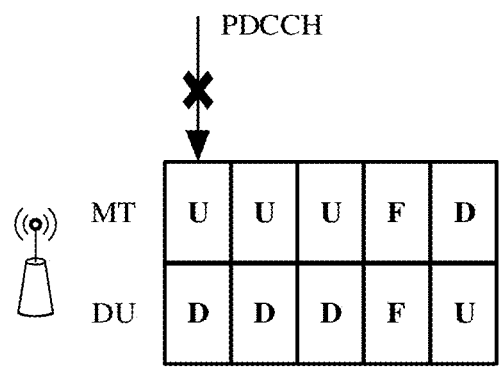
FIG. 13 is a schematic diagram 1 of a transmission resource configuration in a search space configuration according to an embodiment of this application.

As shown in FIG. 13, if the time resource location indicated by the search space configuration is U (that is, an uplink resource) in the JAB node-dedicated configuration, the search space configuration in the configuration period is ignored, and the IAB node-dedicated configuration is still used in the configuration period.

Figure 14:
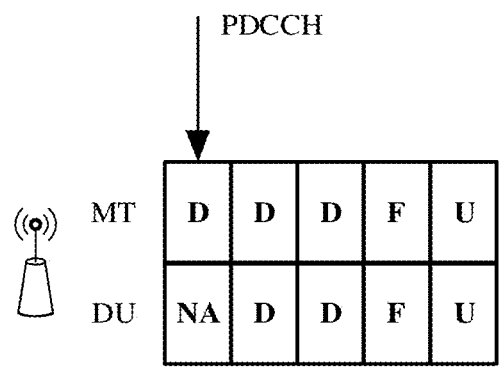
FIG. 14 is a schematic diagram 2 of a transmission resource configuration in a search space configuration according to an embodiment of this application.

As shown in FIG. 14, if the time resource location indicated by the search space configuration is U (that is, an uplink resource) in the JAB node-dedicated configuration, the IAB node-dedicated configuration in the configuration period is ignored, and a cell-specific TDD uplink-downlink-configuration common is used.

Figure 15:
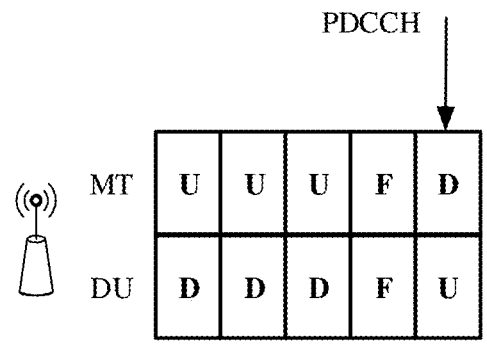
FIG. 15 is a schematic diagram 3 of a transmission resource configuration in a search space configuration according to an embodiment of this application.

As shown in FIG. 15, if the time resource location indicated by the search space configuration is in the configuration period in the IAB node-dedicated configuration, the search space changes with an uplink/downlink transmission location in the configuration period in the IAB node-dedicated configuration. For example, if transmission directions of several slots/symbols at the end of the configuration period in the IAB node-dedicated configuration are downlink, in the search space configuration in this configuration period, a slot/symbol at the end is automatically configured.

(5) The second signaling is used to indicate to send HARQ feedback information on the second time resource.

The first node uses the first configuration when the second time resource in the first configuration is uplink; or uses the second configuration when the second time resource in the first configuration is downlink.

Based on a PUCCH, a HARQ feedback location is a location indicated in scheduling by a parent node or a donor node of the JAB node.

Figure 16:
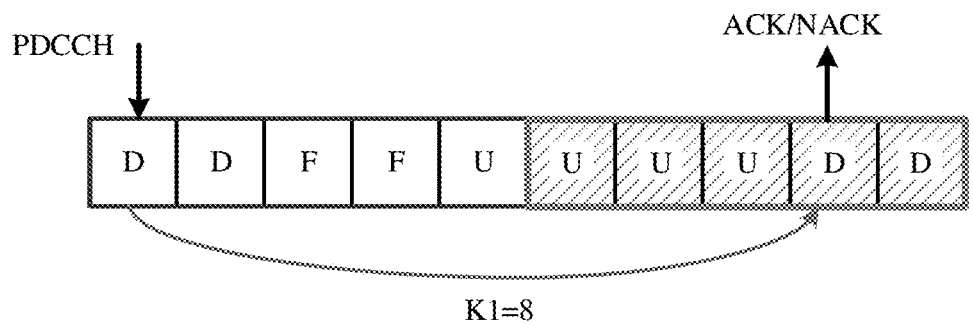
FIG. 16 is a schematic diagram 1 of a transmission resource configuration during HARQ feedback in a second manner according to an embodiment of this application.

As shown in FIG. 16, if a HARQ feedback location indicated by the parent node in a previous transmission conflicts with the IAB node-dedicated configuration, the IAB node-dedicated configuration becomes invalid at this time, and the original cell-specific TDD uplink-downlink-configuration common is used.

If a HARQ feedback location indicated by the parent node in a previous transmission does not conflict with the IAB node-dedicated configuration, the IAB node-dedicated configuration is used.

Figure 17:
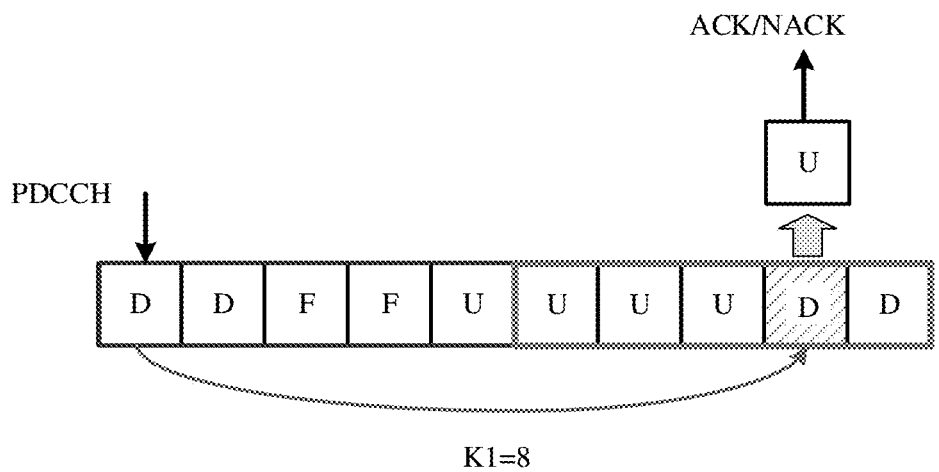
FIG. 17 is a schematic diagram 2 of a transmission resource configuration during HARQ feedback in a second manner according to an embodiment of this application.

As shown in FIG. 17, if a HARQ feedback location indicated by the parent node in a previous transmission conflicts with the IAB node-dedicated configuration, a direction of a corresponding slot is changed to uplink, and directions of remaining slots still use a direction in the IAB node-dedicated configuration.

(6) The second signaling is used to indicate to send CSI, a periodic CSI, a semi-persistent CSI, or an aperiodic SRS on the second time resource.

The first node uses the first configuration when the second time resource in the first configuration is uplink; or uses the second configuration when the second time resource in the first configuration is downlink.

For example, if an aperiodic CSI reporting location indicated by the parent node of the IAB node in a previous transmission conflicts with the IAB node-dedicated configuration, the IAB node-dedicated configuration becomes invalid at this time, and the original cell-specific TDD uplink-downlink-configuration common is used. In the embodiments of this application, "conflict" means that a signal transmission direction is inconsistent with a configured transmission direction. This explanation is applicable to the full text.

If an aperiodic CSI reporting location indicated by the parent node of the JAB node in a previous transmission does not conflict with the JAB node-dedicated configuration, the JAB node-dedicated configuration continues to be used.

For example, if an aperiodic CSI reporting location indicated by the parent node in a previous transmission conflicts with the IAB node-dedicated configuration, a direction of a corresponding slot is changed to uplink, and directions of remaining slots still use the IAB node-dedicated configuration.

For example, for periodic/semi-persistent CSI-RS reporting, in addition to CSI reporting triggered by aperiodic DCI, there is also CSI reporting that is semi-statically configured. The CSI reporting that is semi-statically configured is specifically classified into periodic CSI reporting and semi-persistent CSI reporting. A difference lies that the periodic CSI-RS reporting is performed based on a period, and for the semi-persistent CSI-RS reporting, the parent node may enable or disable reporting of the IAB MT by using the DCI based on a preconfigured period.

In a configuration period in the IAB node-dedicated configuration, if a resource transmission direction of the periodic or semi-persistent CSI reporting conflicts with a transmission direction in the IAB node-dedicated configuration, no feedback (or no reporting) is performed in the configuration period.

In another possible case, if a resource transmission direction of the periodic or semi-persistent CSI reporting conflicts with a transmission direction in the IAB node-dedicated configuration, the IAB node-dedicated configuration is not used, but the cell-specific TDD uplink-downlink-configuration common is used. In this embodiment of this application, the TDD uplink-downlink-configuration common may be a cell-specific TDD uplink-downlink-configuration common or a cell-granularity TDD uplink-downlink-configuration common. Some examples are described by using the cell-specific TDD uplink-downlink-configuration common, but this embodiment is not limited thereto.

For example, the aperiodic SRS is a reference signal that is sent in uplink. Whether to use the IAB node-dedicated configuration is determined based on whether aperiodic SRS sending triggered by using received DCI is performed at an uplink location in the cell-specific TDD uplink-downlink-configuration common.

If an aperiodic SRS location indicated by the parent node in a previous transmission conflicts with a transmission direction in the IAB node-dedicated configuration, the IAB node-dedicated configuration becomes invalid at this time, and the original cell-specific TDD uplink-downlink-configuration common is used.

If an aperiodic SRS location indicated by the parent node in a previous transmission does not conflict with the IAB node-dedicated configuration, the IAB node-dedicated configuration is used.

If an SRS location indicated by the parent node in a previous transmission conflicts with the IAB node-dedicated configuration, a direction of a corresponding slot is changed to uplink, and directions of remaining slots still use the IAB node-dedicated configuration.

The periodic/semi-persistent SRS is similar to the periodic/semi-persistent CSI-RS report.

In a configuration period in the IAB node-dedicated configuration, if a time resource for sending the periodic or semi-persistent SRS conflicts with a transmission direction in the IAB node-dedicated configuration, no SRS is sent in the configuration period.

In another possible case, in a configuration period in the IAB node-dedicated configuration, if a time resource for sending the periodic or semi-persistent SRS conflicts with a transmission direction in the IAB node-dedicated configuration, the IAB node-dedicated configuration is not used, but the cell-specific TDD uplink-downlink-configuration common is used.

In this embodiment of this application, the foregoing provides a description in which the donor node or the parent node of the first node sends the transmission resource configuration to the first node, where the transmission resource configuration includes two configurations: the first configuration and the second configuration. On a basis of receiving the two configurations, the first node selects an adaptive configuration for a special signal such as a periodically sent signal or a periodically sent resource, or rewrites a transmission direction in the configuration.

Figure 18:
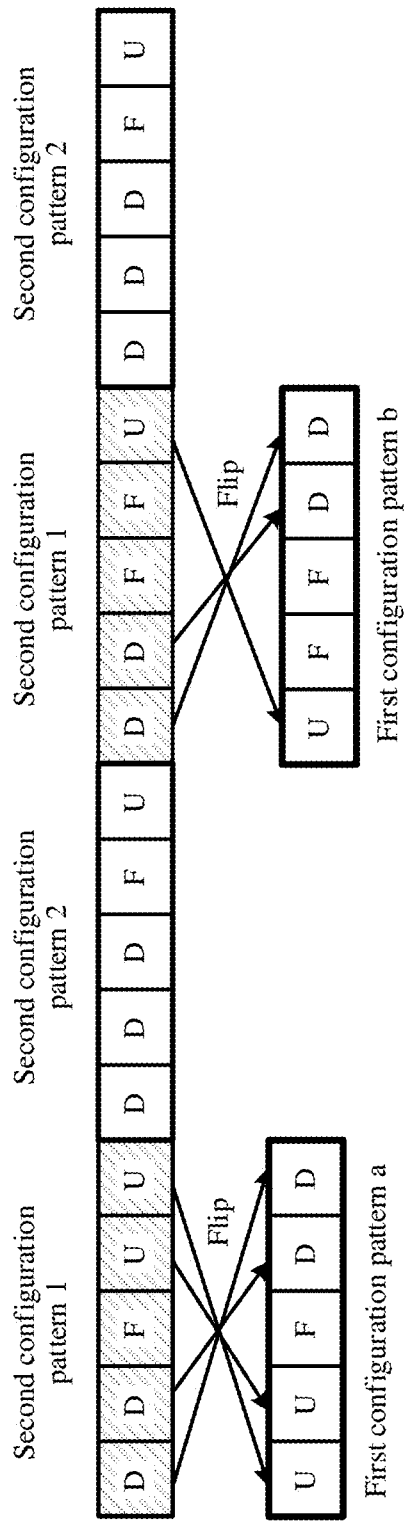
FIG. 18 is a schematic diagram of another transmission resource configuration method according to an embodiment of this application.

Optionally, in this embodiment of this application, the first configuration may not be configured, and a transmission direction of a portion of time resources in the second configuration may be flipped or rewritten based on the original second configuration. Specifically, for example, a downlink resource in the original second configuration may be converted into an uplink resource, and an uplink resource in the original second configuration may be converted into a downlink resource. Alternatively, in the original second configuration, the first M downlink resources and the last N uplink resources are flipped to the first N uplink resources and the last M downlink resources. In this case, transmission locations of a portion of special signals/channels (for example, periodically sent signals or periodic resources or scheduled resources) may also be flipped. For example, as shown in FIG. 18, one slot is represented by one grid, and a PRACH resource originally in a penultimate slot is flipped to a second U slot in an IAB-dedicated TDD pattern.

Transmission directions at these transmission locations may be set to corresponding transmission directions. For a specific manner, refer to the foregoing descriptions.

In the foregoing embodiments provided in this application, the methods provided in the embodiments of this application are separately described from perspectives of the first node, the second node, and interaction between the first node and the second node. To implement functions in the method provided in the embodiments of this application, the first node and the second node may include a hardware structure and/or a software module, and implement the functions in a form of the hardware structure, the software module, or a combination of the hardware structure and the software module. Whether a specific function in the foregoing functions is performed by the hardware structure, the software module, or the combination of the hardware structure and the software module depends on a specific application and a design constraint of the technical solutions.

Figure 19:
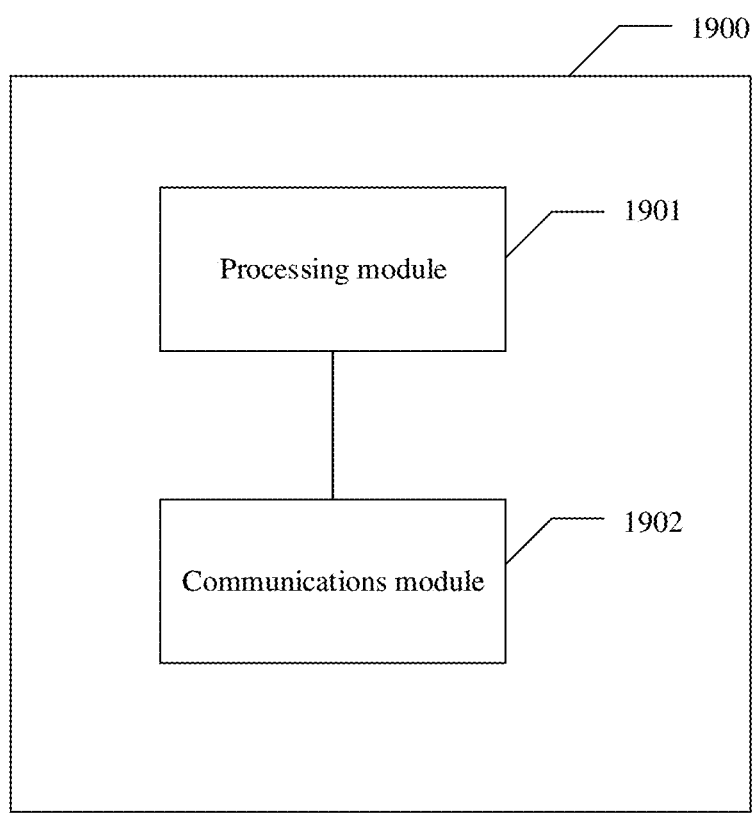
FIG. 19 is a schematic structural diagram 1 of an apparatus according to an embodiment of this application.

As shown in FIG. 19, based on a same technical concept, an embodiment of this application further provides an apparatus 1900. The apparatus 1900 may be the first node or the second node described above, or may be an apparatus in the first node or the second node, or may be an apparatus that can be used with the first node or the second node. In a design, the apparatus 1900 may include modules that are in a one-to-one correspondence with the methods/operations/steps/actions performed by the first node or the second node in the foregoing method embodiments. The modules may be implemented by a hardware circuit, software, or a combination of a hardware circuit and software. In a design, the apparatus may include a processing module 1901 and a communications module 1902.

When being configured to perform the method performed by the first node:

The communications module 1902 is configured to receive a transmission resource configuration from the second node. For the transmission resource configuration, refer to the foregoing description. Details are not described herein again.

The processing module 1901 is configured to switch, based on first signaling, a transmission direction of a first time resource in the first configuration by using the first configuration; or configured to use the first configuration or the second configuration based on second signaling.

The processing module 1901 and the communications module 1902 may be further configured to perform another corresponding step or operation performed by the first node in the foregoing method embodiment. Details are not described herein again.

When being configured to perform the method performed by the second node:

The communications module 1902 is configured to send a transmission resource configuration to the first node. For the transmission resource configuration, refer to the foregoing description. Details are not described herein again.

The processing module 1901 and the communications module 1902 may be further configured to perform another corresponding step or operation performed by the second node in the foregoing method embodiment. Details are not described herein again.

In the embodiments of this application, division into modules is an example and is merely logical function division. In actual implementation, another division manner may be used. In addition, functional modules in the embodiments of this application may be integrated into one processor, or may exist alone physically, or two or more modules may be integrated into one module. The integrated module may be implemented in a form of hardware, or may be implemented in a form of a software functional module.

Figure 20:
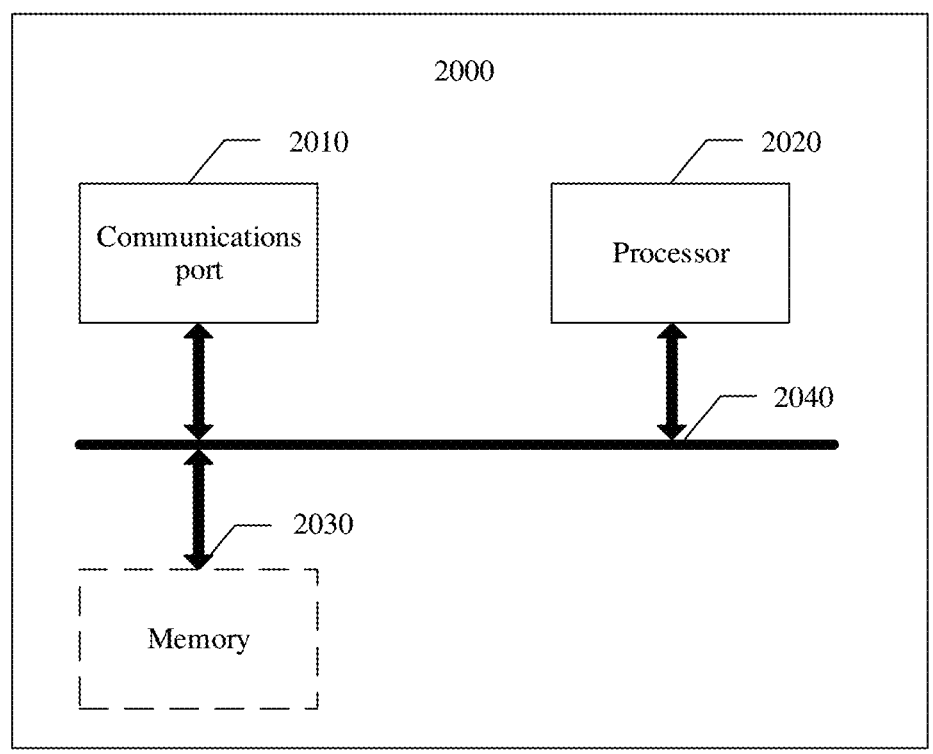
FIG. 20 is a schematic structural diagram 2 of an apparatus according to an embodiment of this application.

FIG. 20 shows an apparatus 2000 according to an embodiment of this application. The apparatus 2000 is configured to implement the function of the first node or the second node in the foregoing method. When the function of the second node is implemented, the apparatus may be the second node, or may be an apparatus in the second node, or may be an apparatus that can be used with the second node. When the function of the first node is implemented, the apparatus may be the first node, or may be an apparatus in the first node, or may be an apparatus that can be used with the first node. The apparatus may be a chip system. In this embodiment of this application, the chip system may include a chip, or may include a chip and another discrete component. The apparatus 2000 includes at least one processor 2020, configured to implement the function of the first node or the second node in the method provided in the embodiments of this application. The apparatus 2000 may further include a communications interface 2010. In the embodiments of this application, the communications interface may be a transceiver, a circuit, a bus, a module, or a communications interface of another type, and is configured to communicate with another device through a transmission medium. For example, the communications interface 2010 is used by the apparatus 2000 to communicate with another device. For example, when the apparatus 2000 is the second node, the another device may be the first node. When the apparatus 2000 is the first node, the another device may be the second node. The processor 2020 receives and sends data through the communications interface 2010, and is configured to implement the method in the foregoing method embodiment. For example, when the function of the first node is implemented, the communications interface 2010 is configured to receive a transmission resource configuration from the second node. The processor 2020 is configured to switch, based on first signaling, a transmission direction of a first time resource in the first configuration by using the first configuration; or configured to use the first configuration or the second configuration based on second signaling.

When the function of the second node is implemented, the communications interface 2010 is configured to send a transmission resource configuration to the first node.

For details, refer to the detailed description in the method embodiment. Details are not described herein again.

The apparatus 2000 may further include at least one memory 2030, configured to store a program instruction and/or data. The memory 2030 is coupled to the processor 2020. Coupling in this embodiment of this application is an indirect coupling or a communication connection between apparatuses, units, or modules, may be in an electrical form, a mechanical form, or another form, and is used for information exchange between the apparatuses, the units, or the modules. The processor 2020 may operate with the memory 2030. The processor 2020 may execute the program instruction stored in the memory 2030. At least one of the at least one memory may be included in the processor.

In this embodiment of this application, a specific connection medium between the communications interface 2010, the processor 2020, and the memory 2030 is not limited. In this embodiment of this application, the memory 2030, the processor 2020, and the communications interface 2010 are connected through a bus 2040 in FIG. 20, and the bus is represented by a thick line in FIG. 20. A connection manner between other components is merely an example for description, and is not limited thereto. The bus may be classified into an address bus, a data bus, a control bus, and the like. For ease of representation, only one thick line is used to represent the bus in FIG. 20, but this does not mean that there is only one bus or only one type of bus.

In this embodiment of this application, the processor may be a general-purpose processor, a digital signal processor, an application-specific integrated circuit, a field programmable gate array, another programmable logic device, a discrete gate, a transistor logic device, or a discrete hardware assembly, and may implement or perform the methods, steps, and logical block diagrams disclosed in the embodiments of this application. The general-purpose processor may be a microprocessor or any conventional processor or the like. The steps of the method disclosed with reference to the embodiments of this application may be directly presented as being performed and completed by a hardware processor, or performed and completed by a combination of hardware and a software module in the processor.

In this embodiment of this application, the memory may be a non-volatile memory, for example, a hard disk (HDD) or solid-state drive (SSD); or may be a volatile memory, for example, a random-access memory (RAM). The memory is any other medium that can be used to carry or store expected program code in a form of an instruction or a data structure and that can be accessed by a computer. However, this is not limited thereto. The memory in this embodiment of this application may alternatively be a circuit or any other apparatus that can implement a storage function, and is configured to store the program instruction and/or the data.

When the apparatus 1900 and the apparatus 2000 are specifically chips or chip systems, the communications module 1902 and the communications interface 2010 may output or receive a baseband signal. When the apparatus 1900 and the apparatus 2000 are specifically devices, the communications module 1902 and the communications interface 2010 may output or receive a radio frequency signal.

An embodiment of this application provides a computer-readable storage medium, storing a computer program. The computer program includes an instruction used to perform the transmission resource configuration method provided in the foregoing embodiment.

An embodiment of this application provides a computer program product including an instruction. When the computer program product runs on a computer, the computer is enabled to perform the transmission resource configuration method provided in the foregoing embodiment.

An embodiment of this application further provides a chip. The chip includes a processor and an interface circuit. The interface circuit is coupled to the processor. The processor is configured to run a computer program or an instruction, to implement the foregoing transmission resource configuration. The interface circuit is configured to communicate with another module outside the chip.

All or some of the methods in the embodiments of this application may be implemented through software, hardware, firmware, or any combination thereof. When software is used to implement the embodiments, all or some of the embodiments may be implemented in a form of a computer program product. The computer program product includes one or more computer instructions. When the computer program instructions are loaded and executed on a computer, all or some of the procedures or functions according to the embodiments of the present disclosure are generated. The computer may be a general-purpose computer, a special-purpose computer, a computer network, a network device, user equipment, or another programmable apparatus. The computer instructions may be stored in a computer-readable storage medium or may be transmitted from a computer-readable storage medium to another computer-readable storage medium. For example, the computer instructions may be transmitted from a website, computer, server, or data center to another website, computer, server, or data center in a wired (for example, a coaxial cable, an optical fiber, or a digital subscriber line (DSL)) or wireless (for example, infrared, radio, or microwave) manner. The computer-readable storage medium may be any usable medium accessible by the computer, or a data storage device, such as a server or a data center, integrating one or more usable media. The usable medium may be a magnetic medium (for example, a floppy disk, a hard disk, or a magnetic tape), an optical medium (for example, a digital video disc (DVD)), a semiconductor medium (for example, an SSD), or the like.

In the embodiments of this application, on a premise that there is no logical contradiction, the embodiments may be mutually referenced. For example, methods and/or terms in the method embodiments may be mutually referenced, functions and/or terms in the apparatus embodiments may be mutually referenced, and functions and/or terms in the apparatus embodiments and the method embodiments may be mutually referenced.

It is clear that a person skilled in the art can make various modifications and variations to the embodiments of this application without departing from the scope of the embodiments of the present disclosure. This application is intended to cover these modifications and variations provided that they fall within the scope of protection defined by the following claims and their equivalent technologies.

What is claimed is:

1. A method, comprising:
receiving, by a first node, a transmission resource configuration from a second node, wherein the transmission resource configuration comprises a first configuration and a second configuration, the first configuration indicates that a start time resource is uplink in a configuration period and an end time resource is downlink in the configuration period, and the second configuration indicates that the start time resource is downlink in the configuration period and the end time resource is uplink in the configuration period; and
using, by the first node, the first configuration or the second configuration based on a first signaling, wherein using the first configuration includes overwriting a configuration on all or a portion of time resources in the second configuration as the first configuration.

2. The method according to claim 1, wherein the first signaling indicates at least one of: to detect a synchronization signal block (SSB) on a second time resource, to measure a reference signal on the second time resource, to send a PRACH on the second time resource, or to receive a search space of a downlink physical control channel on the second time resource, wherein:
in response to the first signaling indicating to detect the SSB on the second time resource, using, by the first node, the first configuration or the second configuration based on the first signaling comprises:
using, by the first node, the first configuration when the second time resource in the first configuration is downlink, or
using the second configuration when the second time resource in the first configuration is uplink;
in response to the first signaling indicating to measure the reference signal on the second time resource, using, by the first node, the first configuration or the second configuration based on the first signaling comprises:
using, by the first node, the first configuration when the second time resource in the first configuration is downlink, or
using the second configuration when the second time resource in the first configuration is uplink;
in response to the first signaling indicating to send the PRACH on the second time resource, using, by the first node, the first configuration or the second configuration based on the first signaling comprises:
using, by the first node, the first configuration when the second time resource in the first configuration is uplink, or
using the second configuration when the second time resource in the first configuration is downlink; and
in response to the first signaling indicating to receive the search space of the downlink physical control channel on the second time resource, using, by the first node, the first configuration or the second configuration based on the first signaling comprises:
using, by the first node, the first configuration when the second time resource in the first configuration is downlink, or
using, by the first node, the second configuration when the second time resource in the first configuration is uplink.

3. The method according to claim 1, wherein the first signaling indicates at least one of: to send hybrid automatic repeat request (HARQ) feedback information on a second time resource, or to send channel state information (CSI), periodic CSI, semi-persistent CSI, or an aperiodic sounding reference signal (SRS) on the second time resource; and
wherein using, by the first node, the first configuration or the second configuration based on the first signaling comprises:
using, by the first node, the first configuration when the second time resource in the first configuration is uplink; or
using, by the first node, the second configuration when the second time resource in the first configuration is downlink.

4. The method according to claim 1, wherein the first configuration comprises at least one of the following:
a quantity of first uplink time resources starting from the start time resource; or
a quantity of first downlink time resources with the end time resource as the end.

5. The method according to claim 1, wherein the second configuration comprises at least one of the following:
a quantity of second downlink time resources starting from the start time resource; or
a quantity of second uplink time resources with the end time resource as the end.

6. The method according to claim 1, wherein the transmission resource configuration further comprises a transmission resource period; and
wherein the method further comprises:
overwriting, by the first node based on the transmission resource period, one or more second patterns in the transmission resource configuration as one or more first patterns; or
reserving, by the first node based on the transmission resource period, a second pattern and a first pattern at time domain locations of the one or more second patterns in the transmission resource configuration;
wherein the one or more first patterns correspond to the first configuration, and the one or more second patterns correspond to the second configuration.

7. The method according to claim 1, wherein:
the first configuration is an integrated access and backhaul (IAB) node-dedicated configuration, and the second configuration is a common configuration; or
both the first configuration and the second configuration are IAB node-dedicated configurations.

8. The method according to claim 1, wherein each time resource of the first configuration and the second configuration is a symbol and the configuration period is a slot.

9. The method according to claim 1, wherein:
the first node is an integrated access and backhaul IAB mobile terminal, MT; or
the first node is an IAB distributed unit, DU.

10. The method according to claim 1, wherein the transmission resource configuration is received in an RRC message.

11. A communications apparatus, comprising:
at least one processor; and
a communications interface, wherein the communications interface is configured to communicate with another communications apparatus; and
wherein when the at least one processor runs a group of programs, the communications apparatus is caused to perform operations comprising:
receiving a transmission resource configuration from a second node, wherein the transmission resource configuration comprises a first configuration and a second configuration, the first configuration indicates that a start time resource is uplink in a configuration period and an end time resource is downlink in the configuration period, and the second configuration indicates that the start time resource is downlink in the configuration period and the end time resource is uplink in the configuration period; and
using the first configuration or the second configuration based on a first signaling, wherein using the first configuration includes overwriting a configuration on all or a portion of time resources in the second configuration as the first configuration.

12. The communication apparatus according to claim 11, wherein:
the communication apparatus is an integrated access and backhaul IAB mobile terminal, MT; or
the communication apparatus is an IAB distributed unit, DU.

13. The communication apparatus according to claim 11, wherein the transmission resource configuration is received in an RRC message.

14. A non-transitory computer-readable storage medium, wherein the non-transitory computer-readable storage medium stores a computer-readable instruction, and when the computer-readable instruction is run on a communications apparatus, the communications apparatus is enabled to perform:
receiving a transmission resource configuration from a second node, wherein the transmission resource configuration comprises a first configuration and a second configuration, the first configuration indicates that a start time resource is uplink in a configuration period and an end time resource is downlink in the configuration period, and the second configuration indicates that the start time resource is downlink in the configuration period and the end time resource is uplink in the configuration period; and
using the first configuration or the second configuration based on a first signaling, wherein using the first configuration includes overwriting a configuration on all or a portion of time resources in the second configuration as the first configuration.

15. The non-transitory computer readable storage medium of claim 14, wherein:
the communication apparatus is an integrated access and backhaul IAB mobile terminal, MT; or
the communication apparatus is an IAB distributed unit, DU.

16. The non-transitory computer-readable storage medium of claim 14, wherein the transmission resource configuration is received in an RRC message.

17. The non-transitory computer-readable storage medium of claim 14, wherein each time resource of the first configuration and the second configuration is a symbol and the configuration period is a slot.

* * * * *